(12) United States Patent
Porchay et al.

(10) Patent No.: US 11,932,302 B1
(45) Date of Patent: Mar. 19, 2024

(54) CONVERTIBLE COMPACT ELECTRIC TRANSPORT DEVICE

(71) Applicant: Honda Motor Co., Ltd., Tokyo (JP)

(72) Inventors: Jackie P. Porchay, Torrance, CA (US); Michael J. Kim, Long Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/068,797

(22) Filed: Dec. 20, 2022

Related U.S. Application Data

(63) Continuation of application No. 17/032,647, filed on Sep. 25, 2020, now abandoned.

(51) Int. Cl.
| | | |
|---|---|---|
| *B62K 15/00* | (2006.01) |
| *B62D 1/183* | (2006.01) |
| *B62D 1/184* | (2006.01) |
| *B62D 1/189* | (2006.01) |
| *B62D 31/00* | (2006.01) |
| *B62K 21/12* | (2006.01) |
| *B62K 21/18* | (2006.01) |

(52) U.S. Cl.
CPC ............. *B62D 1/183* (2013.01); *B62D 1/184* (2013.01); *B62D 1/189* (2013.01); *B62D 31/006* (2013.01); *B62K 15/00* (2013.01); *B62K 21/12* (2013.01); *B62K 21/18* (2013.01); *Y10T 74/20816* (2015.01)

(58) Field of Classification Search
CPC ........ B62K 15/00; B62K 21/12; B62K 21/18; B62D 1/183; B62D 1/184; B62D 1/189; B62D 31/006; Y10T 74/20792; Y10T 74/2081; Y10T 74/20816

USPC ........ 180/208, 218, 219, 220; 280/287, 278, 280/37; 74/551.3, 551.6, 551.7
See application file for complete search history.

(56) References Cited

U.S. PATENT DOCUMENTS

| | | | |
|---|---|---|---|
| 3,316,993 A | 5/1967 | Weitzner |
| 5,097,922 A | 3/1992 | Stagi |
| (Continued) | | |

FOREIGN PATENT DOCUMENTS

| | | | |
|---|---|---|---|
| CN | 201447022 U | 5/2010 |
| CN | 201506429 U | 6/2010 |
| (Continued) | | |

OTHER PUBLICATIONS

Definition of "hinge" from The Free Dictionary By Farlex; https://www.thefreedictionary.com/hinge; Mar. 31, 2022.

*Primary Examiner* — Keith J Frisby
(74) *Attorney, Agent, or Firm* — Plumsea Law Group, LLC

(57) ABSTRACT

A compact electric transport device that is convertible between a stowed configuration and a riding configuration is described. In one embodiment, a foldable steering assembly for an electric transport device includes a steering column disposed within an opening along a top surface of the electric transport device. The steering column has a horizontal orientation that extends along a length of the electric transport device within the opening in a folded position. The foldable steering assembly also includes a steering shaft connected to an axle of a wheel of the electric transport device. The foldable steering assembly further includes a hinge connecting the steering column to the steering shaft. The steering column is configured to transition to a vertical orientation that is perpendicular to the opening along the top surface of the electric transport device in an extended position.

18 Claims, 20 Drawing Sheets

(56) References Cited

U.S. PATENT DOCUMENTS

| | | |
|---|---|---|
| 6,273,442 B1 | 8/2001 | Fallon |
| 7,159,884 B2 | 1/2007 | Gu |
| 7,703,567 B2 | 4/2010 | Wang |
| 8,695,999 B2 | 4/2014 | Von Bismarck |
| 8,887,852 B2 | 11/2014 | Schaap |
| 8,915,512 B2 | 12/2014 | Kim |
| 9,422,022 B2 | 8/2016 | Sharkan et al. |
| 9,896,148 B2 | 2/2018 | Baba |
| 2004/0056442 A1 | 3/2004 | Ostrowski et al. |

FOREIGN PATENT DOCUMENTS

| | | |
|---|---|---|
| CN | 203623897 U | 6/2014 |
| CN | 105752247 A | 7/2016 |
| CN | 206664786 U | 11/2017 |
| CN | 105905217 B | 6/2018 |
| CN | 108674555 A | 10/2018 |
| CN | 109572899 A | 4/2019 |
| DE | 3636064 A1 | 4/1988 |
| FR | 2515132 A1 | 4/1983 |
| FR | 2993233 B1 | 12/2014 |
| JP | 2009006107 A | 1/2009 |
| KR | 100982777 B1 | 9/2010 |
| WO | 2009071004 A1 | 6/2009 |
| WO | 2010143155 A2 | 12/2010 |

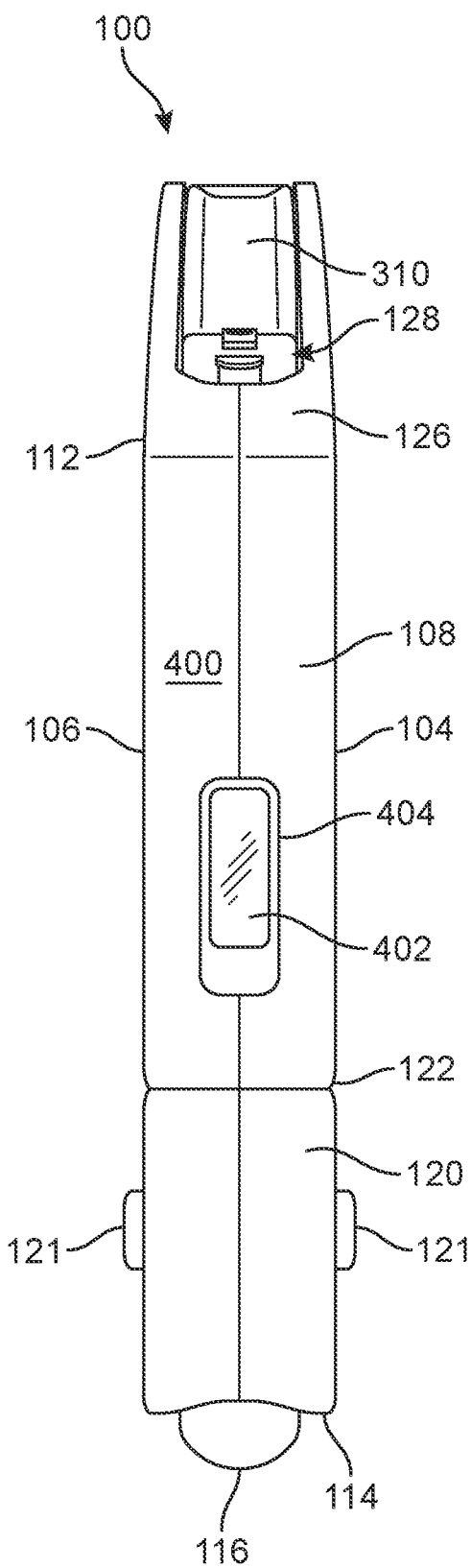
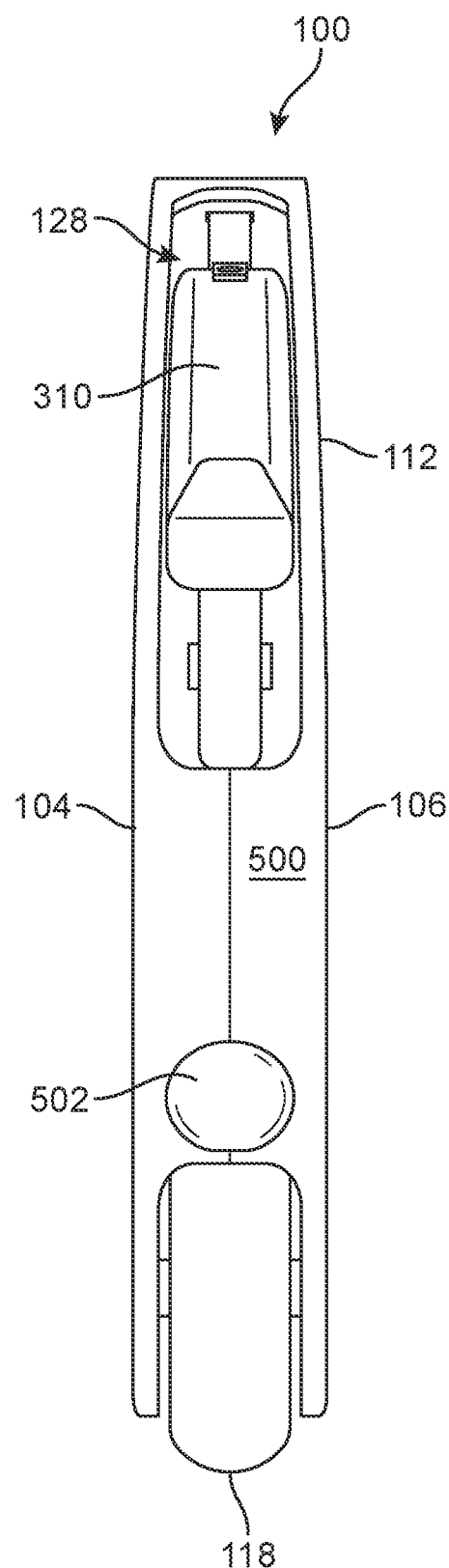
FIG. 4
FIG. 5

CONVERTIBLE COMPACT ELECTRIC TRANSPORT DEVICE

CROSS-REFERENCE TO RELATED APPLICATION

This application is a continuation of and claims benefit to U.S. patent application Ser. No. 17/032,647, filed on Sep. 25, 2020 and titled "Convertible Compact Electric Transport Device", the disclosure of which application is incorporated by reference herein in its entirety.

BACKGROUND

This disclosure relates generally to vehicles, and in particular to a compact electric transport device that is convertible between a stowed configuration and a riding configuration.

With rising prices of gasoline and automobiles, many people may turn to other more cost efficient modes of transportation such as, for example, mopeds, bicycles, scooters and, more recently, electric personal transport devices, such as electric scooters. These electric transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Accordingly, there is a need in the art for an improved compact electric transport device.

SUMMARY

In one aspect, a foldable steering assembly for an electric transport device is provided. The foldable steering assembly includes a steering column disposed within an opening along a top surface of the electric transport device. The steering column has a horizontal orientation that extends along a length of the electric transport device within the opening in a folded position. The foldable steering assembly also includes a steering shaft connected to an axle of a wheel of the electric transport device. The foldable steering assembly further includes a hinge connecting the steering column to the steering shaft. The steering column is configured to transition to a vertical orientation that is perpendicular to the opening along the top surface of the electric transport device in an extended position.

In another aspect, a steering column for an electric transport device is provided. The steering column includes a receiving slot extending vertically along a length of the steering column. A handlebar is disposed within the receiving slot. The handlebar has a vertical orientation inside the receiving slot in a folded position. The handlebar is configured to pivot around a central hub to transition the handlebar from the vertical orientation within the receiving slot to a horizontal orientation in an extended position such that the handlebar is perpendicular to the steering column.

In another aspect, a method of transitioning an electric transport device from a stowed configuration to a riding configuration is provided. The method includes extending a steering column outwards from a folded position within an opening along a top surface of the electric transport device to a vertical orientation that is perpendicular to the opening along the top surface of the electric transport device in an extended position. The method also includes pivoting a seat post outwards from a folded position within the opening along the top surface of the electric transport device to an extended position that extends past a rear edge of the electric transport device. The method further includes pivoting a handlebar disposed within a receiving slot of the steering column from a vertical orientation inside the receiving slot in a folded position to a horizontal orientation in an extended position such that the handlebar is perpendicular to the steering column.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 4 is a front view of the example embodiment of the electric scooter in accordance with aspects of the present disclosure;

FIG. 5 is a rear view of the example embodiment of the electric scooter in accordance with aspects of the present disclosure;

DETAILED DESCRIPTION

Embodiments of electric transport devices that are convertible between a stowed configuration and a riding configuration are described herein. The techniques described in connection with the present embodiments may be used to provide an electric transport device having a convenient, compact form factor that allows a user to carry it in a primary vehicle, on public transportation, and/or on other forms of transportation to be used for "last-mile" or "first-mile" trips to and from a destination.

The example embodiments are described herein with reference to an electric transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of electric transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned from a stowed configuration in which components of the electric scooter are stored or disposed inside the rectangular outer casing to a riding configuration in which components of the electric scooter are folded or opened from their stored positions to extended positions outside of the outer casing so that the electric scooter may be operated or ridden by a user.

Figure 1:
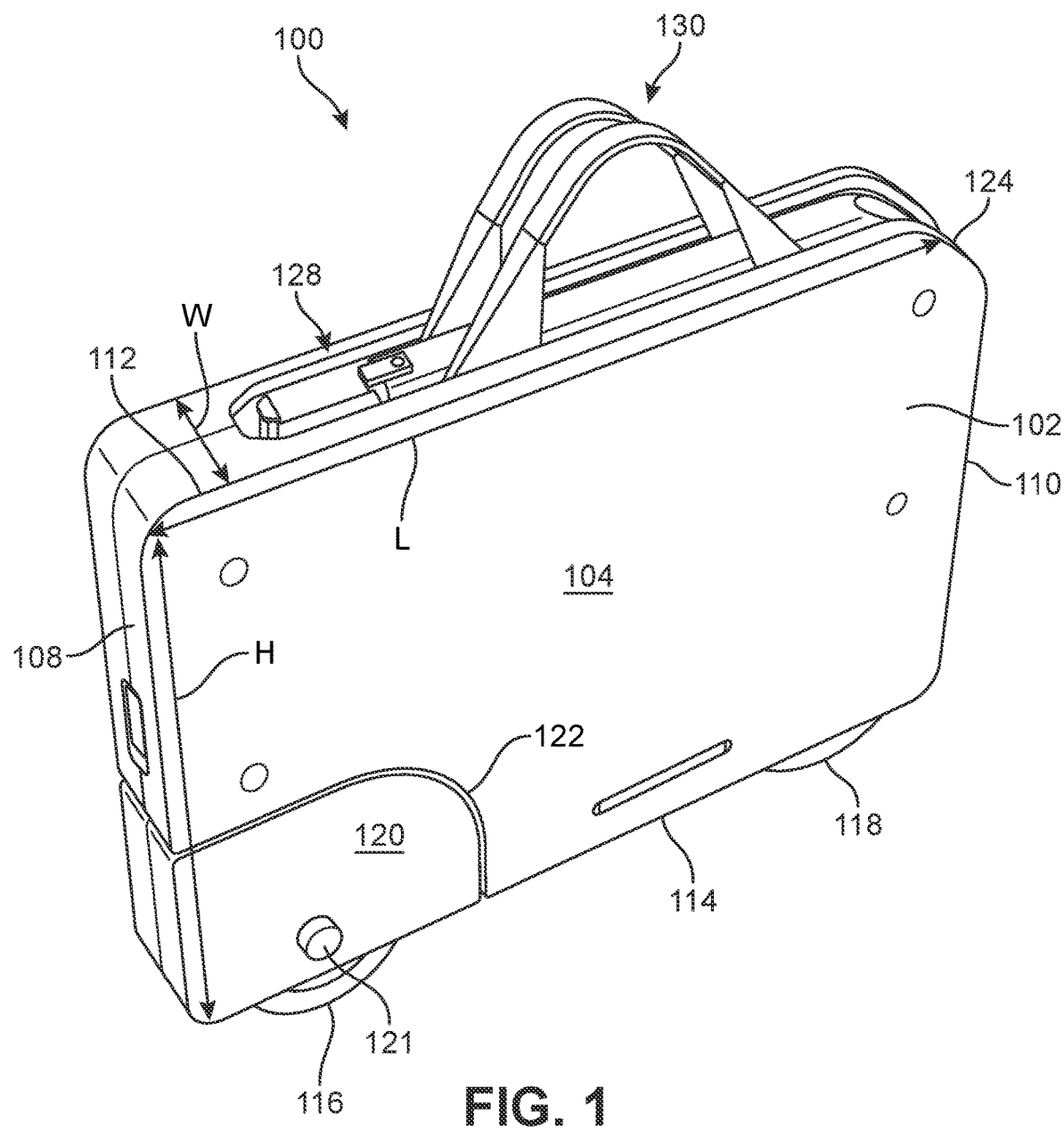
FIG. 1 is an isometric view of one side of an example embodiment of an electric transport device in the form of an electric scooter in a stowed configuration in accordance with aspects of the present disclosure.
Figure 2:
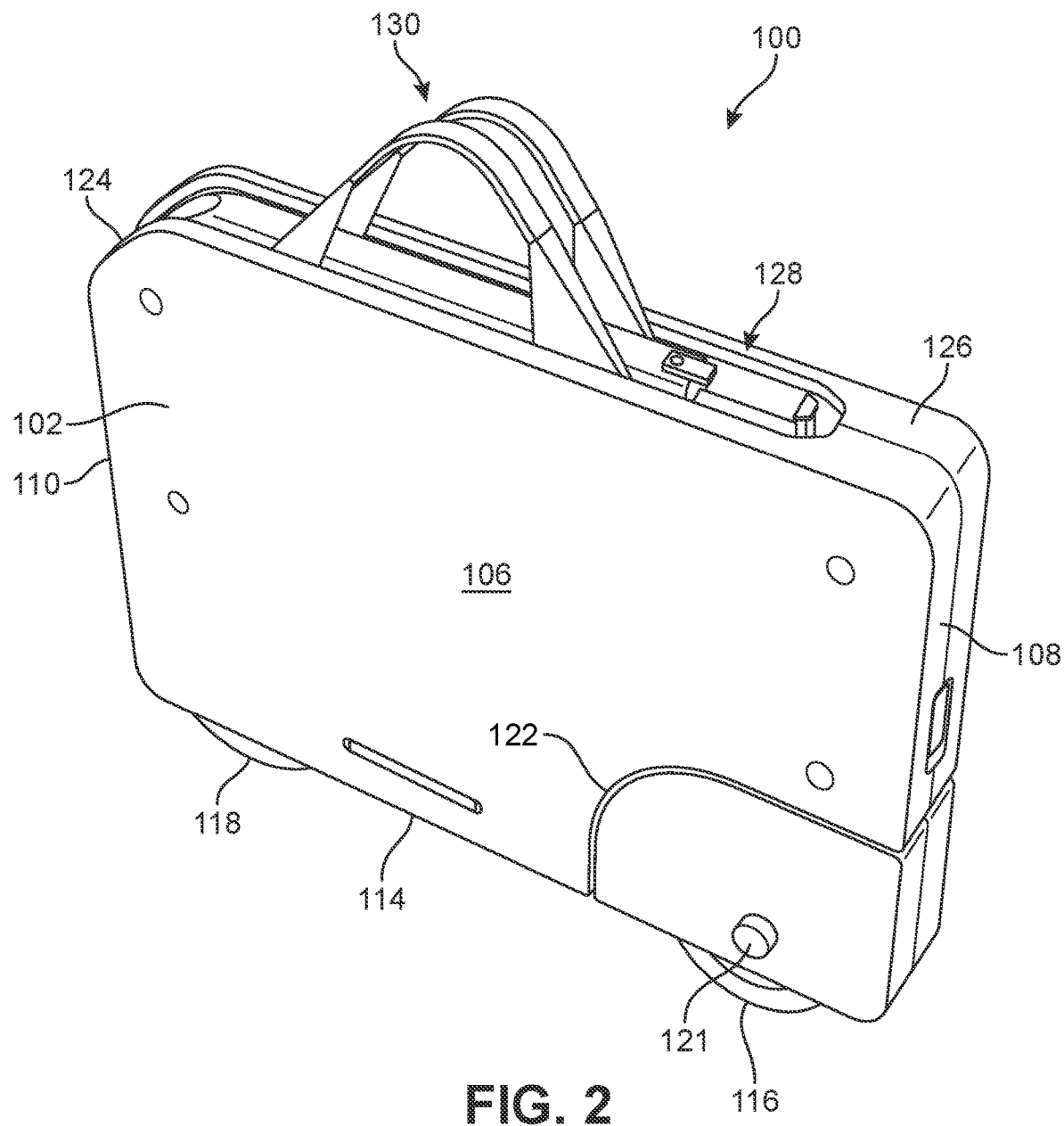
FIG. 2 is an isometric view of an opposite side of the example embodiment of the electric scooter in the stowed configuration in accordance with aspects of the present disclosure.

Referring now to FIGS. 1 and 2, an example embodiment of an electric scooter 100 is shown. In some embodiments, electric scooter 100 may be transitioned or converted between a stowed configuration in which components of electric scooter 100 are stored or disposed inside an outer casing 102 to a riding configuration in which components of electric scooter 100 are folded or opened from their stored positions to extended positions outside of outer casing 102 so that electric scooter 100 may be operated or ridden by a user. As shown in FIGS. 1-6, electric scooter 100 is in the stowed configuration. In an example embodiment, outer casing 102 of electric scooter 100 may be made of an impact resistant plastic or polymer. It should be understood that other materials may alternatively or additionally be used.

In this embodiment, electric scooter 100 has an approximately rectangular shape defined by outer casing 102 having a length (L) that is longer than a height (H). Outer casing 102 includes a first side surface 104 (shown in FIG. 1) and an opposite second side surface 106 (shown in FIG. 2). Outer casing 102 has a width (W) between first side surface 104 and second side surface 106 that defines a thickness of electric scooter 100. In an example embodiment, side surfaces of outer casing 102 are substantially flat, including each of first side surface 104 and second side surface 106. Outer casing 102 of electric scooter 100 extends between a front edge 108 and an opposite rear edge 110, as well as a top edge 112 and an opposite bottom edge 114. Front edge 108, rear edge 110, top edge 112, and bottom edge 114 are substantially straight and define an outer perimeter of rectangular-shaped outer casing 102 of electric scooter 100.

In one embodiment, length (L) of electric scooter 100 is approximately 26 inches, height (H) of electric scooter 100 (from bottom edge 114 to top edge 112) is approximately 20 inches, and width (W) of electric scooter 100 is approximately 3 inches. It should be understood that these measurements are exemplary and the dimensions of electric scooter 100 (e.g., L×H×W) may vary to be larger or smaller. Additionally, in one embodiment, electric scooter 100 has a weight of approximately 25-27 pounds. In other embodiments, the weight of electric scooter 100 may be larger or smaller. With this arrangement, electric scooter 100 is configured to have a size and weight that allows electric scooter 100 to be easily and conveniently transported by a user in the stowed configuration.

In this embodiment, a front wheel 116 is visible along bottom edge 114 of electric scooter 100 near front edge 108. Electric scooter 100 also includes a rear wheel 118 that is disposed inside outer casing 102 (i.e., in the stowed configuration as shown in FIGS. 1 and 2) along bottom edge 114 near rear edge 110. In an example embodiment, front wheel 116 of electric scooter 100 may be steerable while rear wheel 118 is not steerable. In one embodiment, front wheel 116 and rear wheel 118 are the same size and have a diameter of approximately 8 inches. In other embodiments, front wheel 116 and rear wheel 118 may be larger or smaller. In addition, in some cases, front wheel 116 and rear wheel 118 may be different sizes (e.g., front wheel 116 may be larger than rear wheel 118 or rear wheel 118 may be larger than front wheel 116).

In an example embodiment, electric scooter 100 includes a front wheel shroud 120 that is separate from outer casing 102 and is configured to cover front wheel 116. Front wheel shroud 120 has a similar configuration as outer casing 102 so as to be substantially flush with side surfaces 104, 106. In one embodiment, front wheel shroud 120 may include an axle receiving member 121 on each side of electric scooter 100 configured to receive and hold an axle of front wheel 116 so that front wheel shroud 120 may move independently from outer casing 102 of electric scooter 100 to allow front wheel 116 to be steered (e.g., using a handlebar, as described below).

In this embodiment, outer casing 102 of electric scooter 100 includes a curved cutout 122 that extends from front edge 108 above front wheel shroud 120 to bottom edge 114 behind front wheel shroud 120. Curved cutout 122 has a corresponding shape as front wheel shroud 120 so as to provide an approximately uniform surface between front wheel shroud 120 and side surfaces 104, 106 of outer casing 102 of electric scooter 100.

In some embodiments, outer casing 102 of electric scooter 100 may include a rounded corner 124 located at the rear of electric scooter 100 extending from top edge 112 to rear edge 110. In an example embodiment, the location of rounded corner 124 may correspond to the location of a seat (as will be described below). With this arrangement, rounded corner 124 may have a substantially smooth surface or edge to provide for increased comfort to a user while sitting on electric scooter 100 in the riding configuration.

Figure 3:
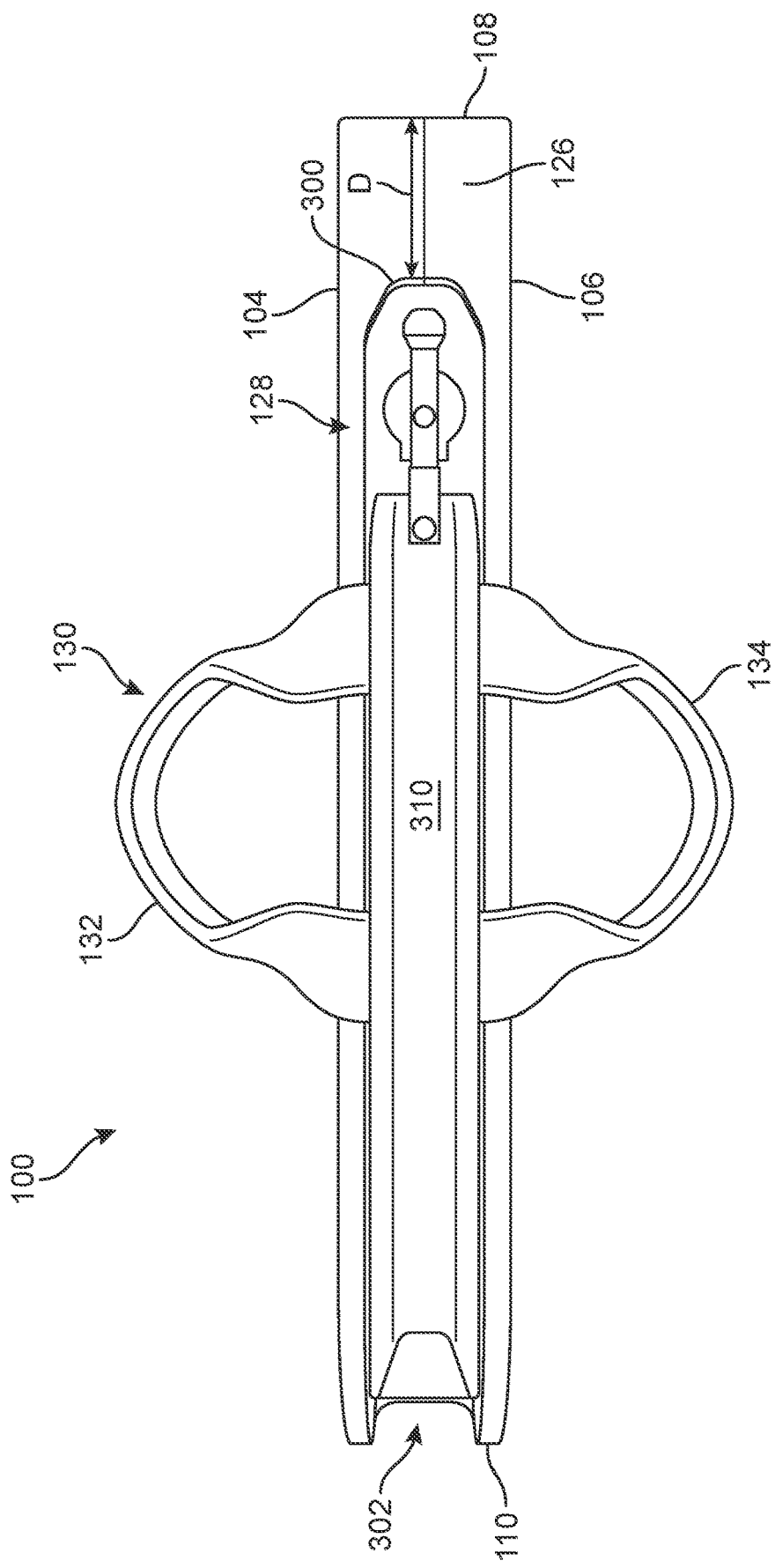
FIG. 3 is a top down view of the example embodiment of the electric scooter in the stowed configuration in accordance with aspects of the present disclosure.

Electric scooter 100 includes a top surface 126 disposed between side surfaces 104, 106. In an example embodiment, top surface 126 includes an opening 128 extending substantially along the length (L) of electric scooter 100. In one embodiment, opening 128 is disposed spaced from front edge 108 of electric scooter 100 and extends all the way to rear edge 110. For example, as shown in FIG. 3, opening 128 extends along top surface 126 from a first end 300 to a second end 302 located at rear edge 110. In this embodiment, first end 300 of opening 128 is spaced from front edge 108 by a distance (D) so that opening 128 is offset on top surface 126. In some embodiments, opening 128 extends to rounded corner 124 and partially extends down rear edge 110. In this embodiment, opening 128 is in the form of a slot disposed between side surfaces 104, 106.

In some embodiments, electric scooter 100 may include provisions configured to allow a user to easily carry and/or transport electric scooter 100 in the stowed configuration. For example, as shown in FIGS. 1-3, electric scooter 100 includes a pair of handles 130. In this embodiment, handles 130 extend out from opening 128 on top surface 126 of electric scooter 100. In an example embodiment, handles 130 are made of a different material than the material forming outer casing 102. For example, handles 130 may be made of a fabric or other flexible material. In some embodiments, handles 130 may be secured or attached to an internal portion of electric scooter 100 disposed inside outer casing 102. In other embodiments, handles 130 may be secured or attached to a portion of outer casing 102. In an example embodiment, handles 130 are disposed on opposite sides of opening 128.

As shown in FIG. 3, a first handle 132 is located on one side of opening 128 and a second handle 134 is located on an opposite side of opening 128. With this arrangement, handles 130 do not interfere with components of electric scooter 100 that are configured to extend out from opening 128 when electric scooter 100 is transitioned or converted from the stowed configuration to the riding configuration, as will be described below. For example, as shown in FIG. 3, a steering column 310 of electric scooter 100 is shown in a folded position within opening 128 when electric scooter 100 is in the stowed configuration and is configured to be unfolded outward from opening 128 to transition electric scooter 100 to the riding configuration.

FIG. 4 illustrates a front view of electric scooter 100. In this embodiment, a front surface 400 of outer casing 102 is shown extending between side surfaces 104, 106 and from top edge 112 to bottom edge 114. In an example embodiment, a headlight 402 is disposed at the front of electric scooter 100. Headlight 402 may be surrounded by a rounded rectangular bezel 404 in front surface 400 of outer casing 102. In one embodiment, headlight 402 is a light emitting diode (LED) type light source. In other embodiments, headlight 402 may be any source of illumination that provides light for a user of electric scooter 100.

FIG. 5 illustrates a rear view of electric scooter 100. In this embodiment, a rear surface 500 of outer casing 102 is shown extending between side surfaces 104, 106 and from top edge 112 to bottom edge 114. In an example embodiment, a taillight 502 is disposed at the rear of electric scooter 100 and is located above rear wheel 118. In some embodiments, taillight 502 includes a red lens having an approximately circular shape that is disposed in rear surface 500 of outer casing 102. In one embodiment, taillight 502 may include an LED type light source that illuminates the red lens. For example, the LED in taillight 502 may be configured to have a first illumination intensity when electric scooter 100 is being operated and a second illumination intensity, greater than the first illumination intensity, when electric scooter 100 is being braked (e.g., using a brake input on handlebar, described below). In other embodiments, taillight 502 may be any source of illumination that provides a light to others to indicate presence of electric scooter 100.

Figure 6:
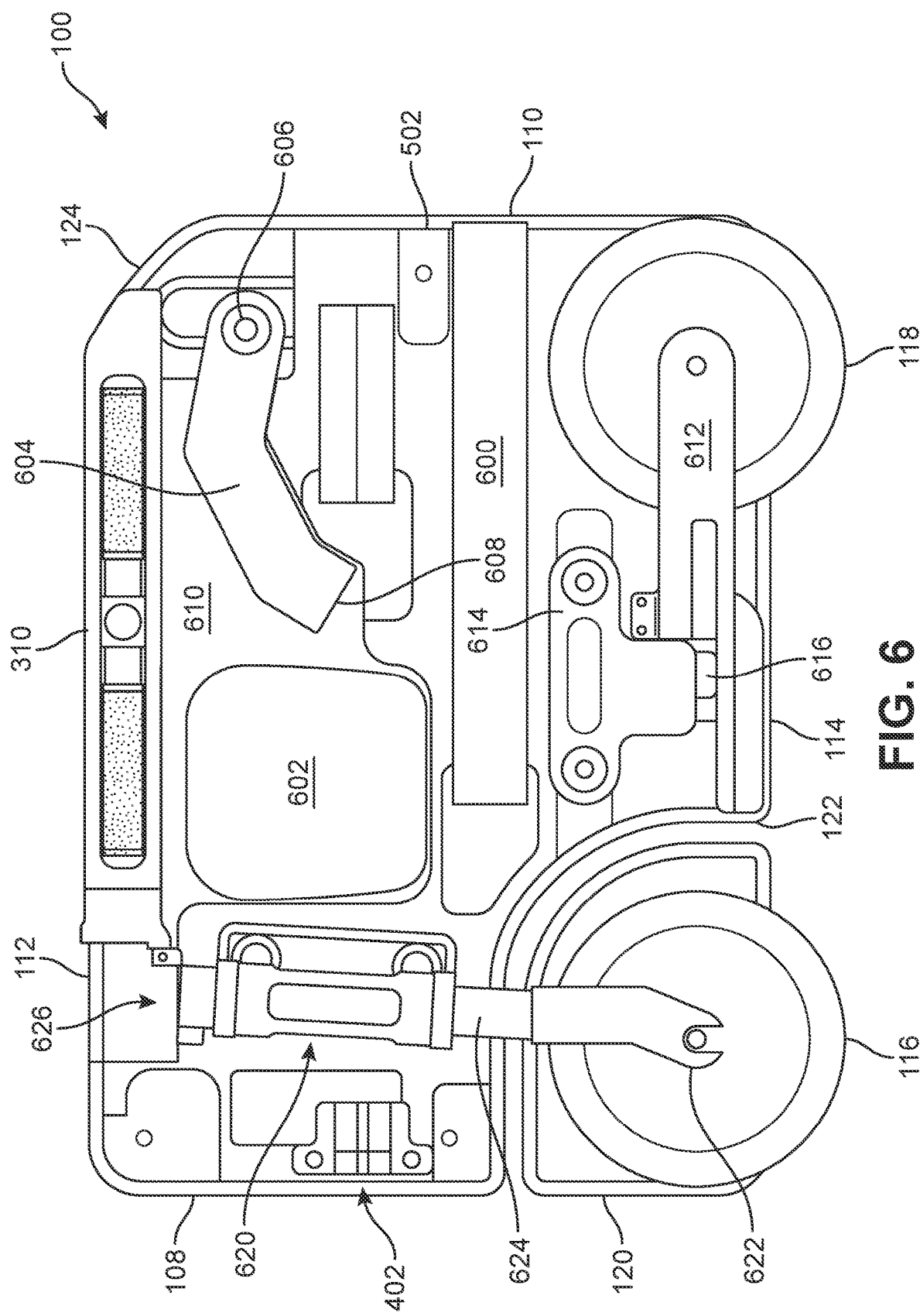
FIG. 6 is a representative view of internal components of the example embodiment of the electric scooter in the stowed configuration in accordance with aspects of the present disclosure.

Referring now to FIG. 6, a representative view of the internal components of electric scooter 100 in the stowed configuration is shown. In this embodiment, a battery 600 is disposed approximately within the middle portion of electric scooter 100. In some embodiments, battery 600 may be electrically connected to various components of electric scooter 100. In one embodiment, battery 600 provides an electrical charge to a power source, such as a motor, that drives one or more wheels of electric scooter 100, including front wheel 116 and/or rear wheel 118. For example, in one embodiment, an electric motor may be integrated into front wheel 116 of electric scooter 100 (e.g., in the hub of front wheel 116). In such embodiments, battery 600 may provide electricity to power the electric motor in front wheel 116.

In other embodiments, an electric motor may be located elsewhere within the interior of electric scooter 100, including as a separate component apart from front wheel 116. In addition, in some cases, the electric motor may be configured to drive a single wheel (e.g., one of front wheel 116 or rear wheel 118) or both wheels (e.g., front wheel 116 and rear wheel 118) of electric scooter 100. In still other cases, each wheel (e.g., front wheel 116 and rear wheel 118) may be provided with an independent electric motor to drive its respective wheel of electric scooter 100.

In some embodiments, electric scooter 100 may include provisions to allow a user to sit on electric scooter 100 when in the riding configuration. In an example embodiment, electric scooter 100 includes a seat 602. In one embodiment, seat 602 is configured to mount to a seat post 604 that is attached internally to the inside of electric scooter 100 via a pivot mechanism 606. When electric scooter 100 is transitioned from the stowed configuration to the riding configuration (as described below), seat post 604 pivots around a pivot mechanism 606 to a position outside of outer casing 102 of electric scooter 100. Once seat post 604 is pivoted outside of outer casing 102, seat 602 may be connected to a top portion 608 of seat post 604 to allow a user to sit on electric scooter 100.

In an example embodiment, a bottom portion of seat 602 and top portion 608 of seat post 604 may include high-strength magnets (e.g., made of neodymium or similar material) that are configured to allow seat 602 to be removably attached to seat post 604. In other embodiments, seat 602 may be removeably or non-removeably attached to seat post 604 using other mechanisms, such as, friction fit connections or via a hinged assembly that allows seat 602 to fold or pivot from top portion 608 of seat post 604 to transition between the stowed configuration inside electric scooter 100 to the riding configuration outside of outer casing 102.

In the stowed configuration shown in FIG. 6, seat 602 is stored in a storage compartment 610 of electric scooter 100. Storage compartment 610 is located inside outer casing 102 of electric scooter 100 between side surfaces 104, 106 and is configured to hold various items, such as seat 602. Additionally, when electric scooter 100 is in the riding configuration, storage compartment 610 may be used to store other items, such as a mobile device or other small object, while the user is riding electric scooter 100. In some embodiments, battery 600 may be electrically connected to an auxiliary charging port accessible from storage compartment 610. The auxiliary charging port may be configured to charge small portable electronic devices (e.g., a mobile device) while being stored in storage compartment 610.

In an example embodiment, rear wheel 118 is initially located inside outer casing 102 of electric scooter 100 in the stowed configuration and is configured to extend to a position outside of outer casing 102 in the riding configuration. In some embodiments, a sliding mechanism may be used to slideably move rear wheel 118 from the stowed configuration to the riding configuration. In an example embodiment, the sliding mechanism may include an arm 612 attached to an axle of rear wheel 118 at one end. Arm 612 is configured to engage with a stop mechanism (not shown) at the opposite end to control linear movement of rear wheel 118. With this arrangement, arm 612 may be pulled in a direction towards rear edge 110 of electric scooter 100 to extend rear wheel 118 outside of outer casing 102. The stop mechanism stops the linear movement of rear wheel 118 by engaging with the opposite end of arm 612 once rear wheel 118 reaches its fully extended position.

The stop mechanism may also lock in place at the end of arm 612 when rear wheel 118 is in the fully extended position to prevent unintentional linear movement of rear wheel 118 back inside outer casing 102. With this arrangement, once rear wheel 118 is fully extended in the riding configuration, arm 612 is locked in place so that rear wheel 118 remains fully extended while electric scooter 100 is being used in the riding configuration. A release mechanism, such as a button or latch, may be provided to unlock the stop mechanism so that rear wheel 118 may be released and allowed to return back inside outer casing 102 of electric scooter 100 to transition or convert from the riding configuration back to the stowed configuration.

In some embodiments, electric scooter 100 may also include provisions to receive the feet of a user while the user is riding electric scooter 100 in the riding configuration. For example, as shown in FIG. 6, a mounting bracket 614 having foot pedals 616 at one end is fixedly attached inside outer casing 102 of electric scooter 100. Foot pedals 616 at the end of mounting bracket 614 are configured to pivot outward (e.g., degrees) from a folded position inside electric scooter 100 in the stowed configuration to an extended position approximately perpendicular to side surfaces 104, 106 of outer casing 102 of electric scooter 100 in the riding configuration. With this arrangement, pedals 616 may be provided to allow a user to rest their feet while riding electric scooter 100.

As shown in FIG. 6, electric scooter 100 includes a steering assembly 620 that is configured to control orientation of front wheel 116 to allow a user to steer electric scooter 100 in the riding configuration. In this embodiment, steering assembly 620 includes a fork 622 that is attached to an axle of front wheel 116 at one end and is attached to a lower portion 624 of a steering shaft. Lower portion 624 of the steering shaft extends upwards towards top edge 112 of electric scooter 100 to a shaft connection mechanism 626. Shaft connection mechanism 626 (shown in detail in FIG. 8) includes a hinge that connects lower portion 624 of the steering shaft to steering column 310. With this arrangement, steering assembly 620 may be transitioned or converted from a folded position when electric scooter 100 is in the stowed configuration to an upright extended position when electric scooter 100 is in the riding configuration, as described below.

Figure 7:
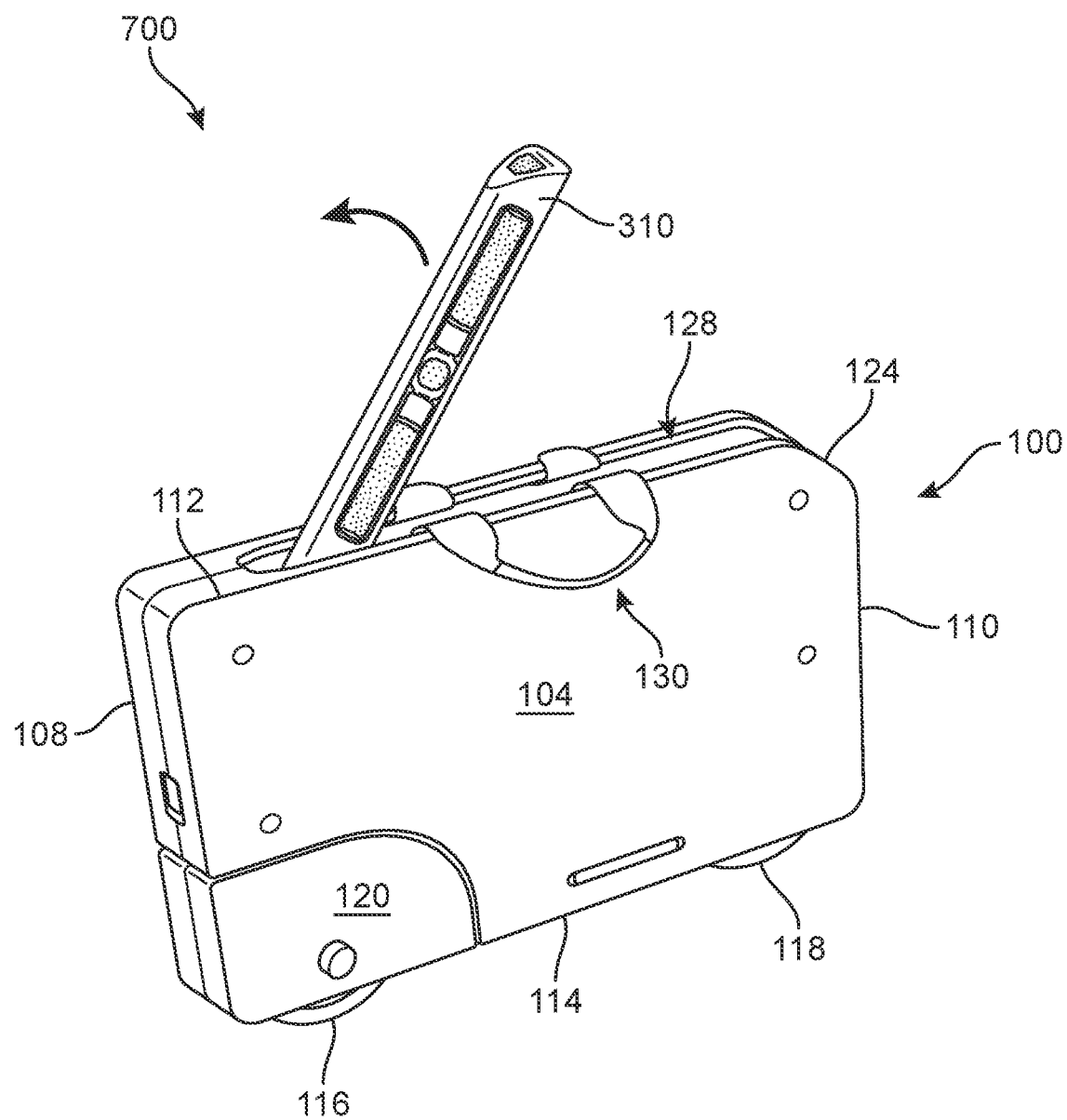
FIG. 7 is a representative view of a steering column being unfolded from the electric scooter to transition from the stowed configuration to a riding configuration in accordance with aspects of the present disclosure.

FIGS. 7 through 20 illustrate steps of a process of transitioning or converting electric scooter 100 from the stowed configuration of FIGS. 1 through 6 to the riding configuration to allow a user to ride electric scooter 100. Referring now to FIG. 7, the process of transitioning or converting electric scooter 100 from the stowed configuration to the riding configuration may begin with a step 700. At step 700, steering column 310 is extended out from its folded position within opening 128 along top side 112 of electric scooter 100. For example, when steering column 310 is in the folded position inside outer casing 102 of electric scooter 100, it is in a substantially horizontal orientation within opening 128. When steering column 310 is raised from the folded position to the extended position, it is in a substantially vertical orientation that is approximately perpendicular to opening 128 and top edge 112 of electric scooter.

Figure 8:
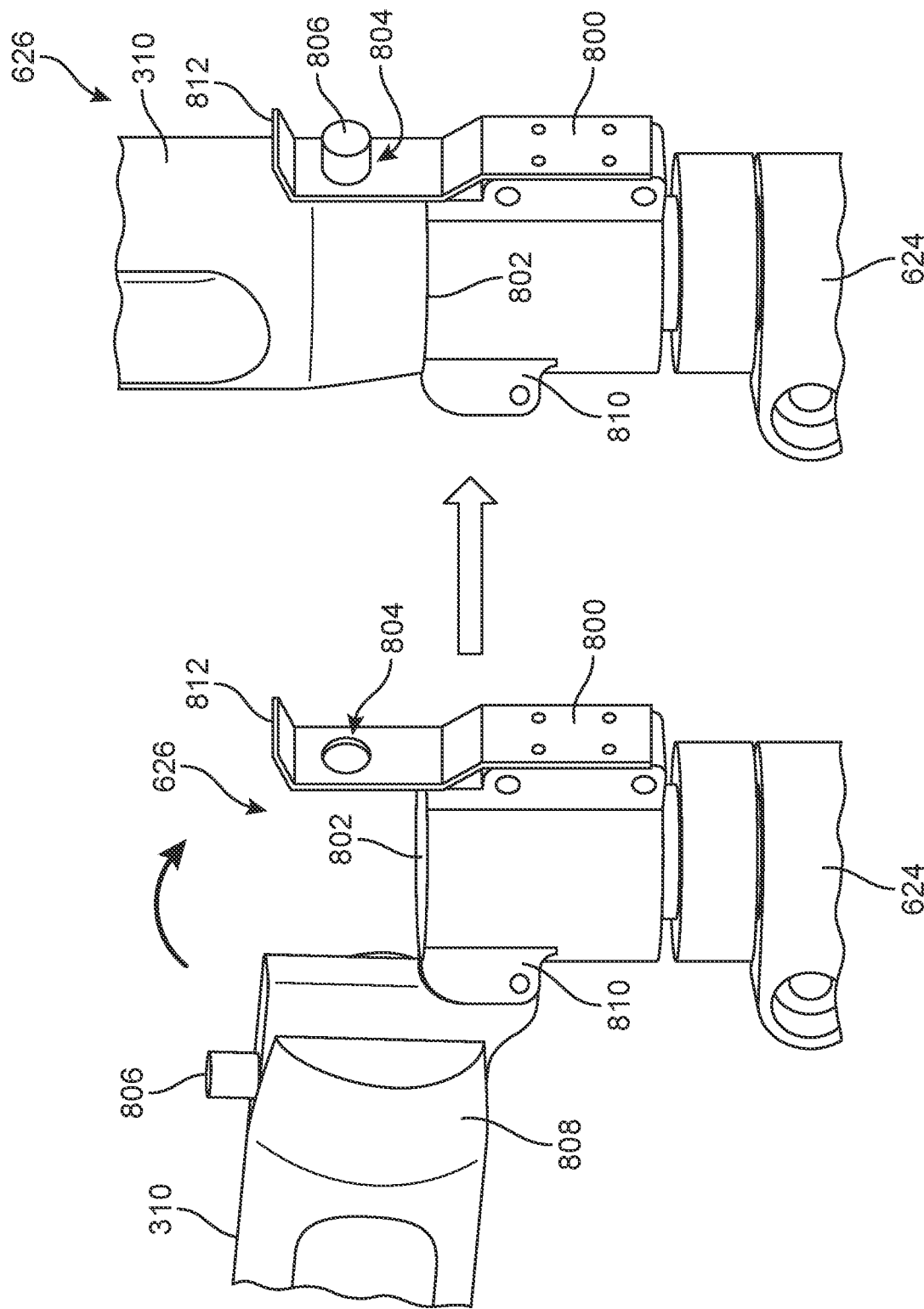
FIG. 8 is an enlarged representative view of a locking mechanism for the steering column of the electric scooter in accordance with aspects of the present disclosure.

In some embodiments, steering column 310 may be locked in place in the extended position using shaft connection mechanism 626, described above. Referring now to FIG. 8, components of shaft connection mechanism 626 are shown in detail. In this embodiment, shaft connection mechanism 626 includes a latch element 800 that extends upwards from an end 802 of lower portion 624 of the steering shaft. Latch element 800 includes a receiving aperture 804 that is configured to mate with an engaging protrusion 806 on a bottom portion 808 of steering column 310. In this embodiment, shaft connection mechanism 626 also includes a hinge 810 that connects lower portion 624 of the steering shaft to bottom portion 808 of steering column 310.

As shown in FIG. 8, when steering column 310 is raised from the folded position to the extended position (as shown in connection with step 700 of FIG. 7), hinge 810 brings bottom portion 808 of steering column 310 in contact with lower portion 624 of the steering shaft. Engaging protrusion 806 extends through receiving aperture 804 of latch element 800 to lock steering column 310 in the substantially vertical orientation. With this arrangement, latch element 800 of shaft connection mechanism 626 keeps steering column 310 upright while electric scooter 100 is in the riding configuration.

Additionally, in some embodiments, shaft connection mechanism 626 also includes a release tab 812 disposed at an end of latch element 800 that is configured to allow engaging protrusion 806 to be released or removed from receiving aperture 804. For example, a user may press down on release tab 812 to cause engaging protrusion 806 to be removed from receiving aperture 804. With this arrangement, bottom portion 808 of steering column 310 may then be moved away from contact with lower portion 624 of the steering shaft via hinge 810 to return steering column 310 to the folded position within opening 128 (i.e., in the stowed configuration of electric scooter 100).

Figure 9:
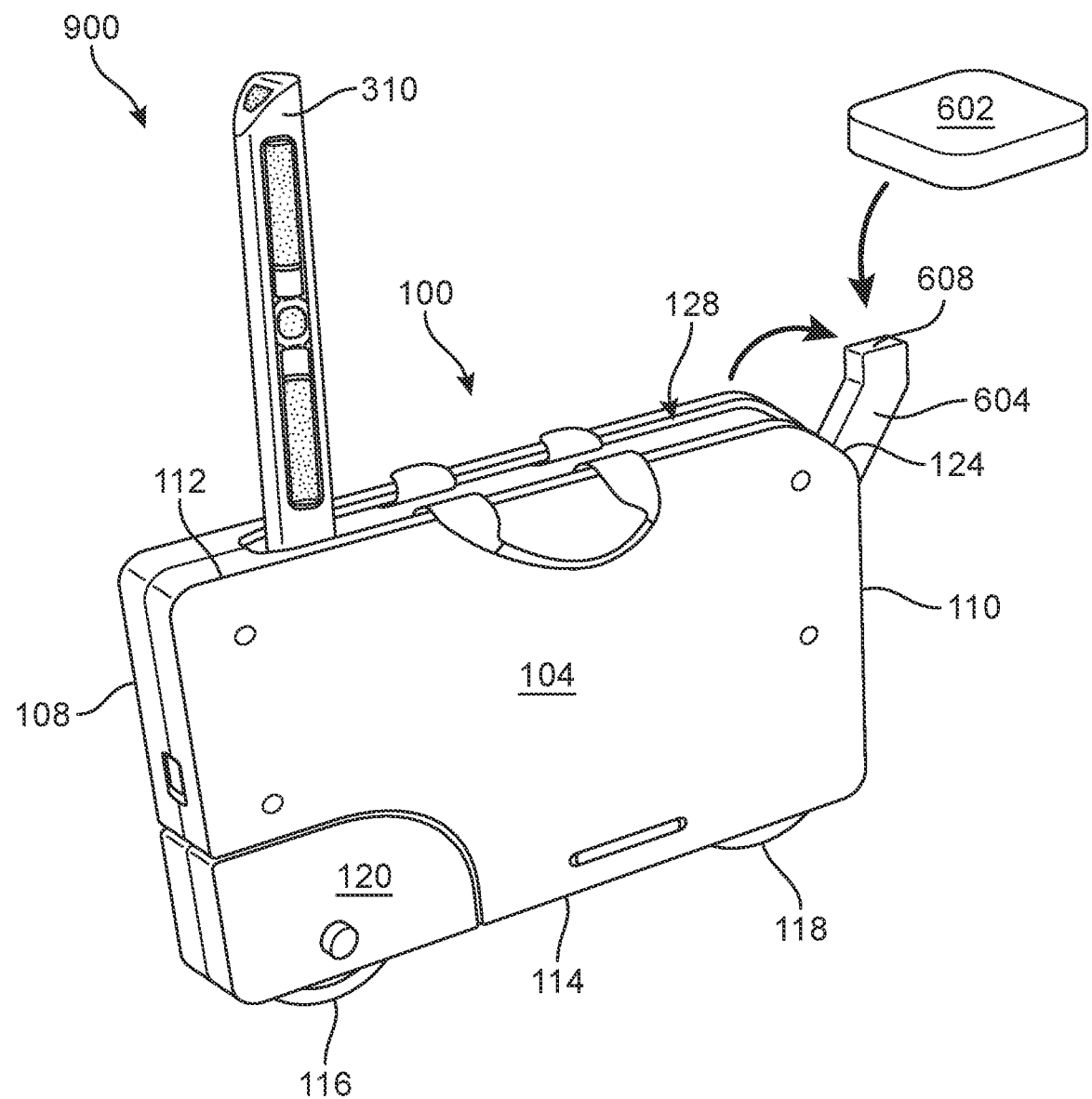
FIG. 9 is a representative view of a seat support post being unfolded from the example embodiment of the electric scooter in accordance with aspects of the present disclosure.

Referring now to FIG. 9, the process of transitioning or converting electric scooter 100 from the stowed configuration to the riding configuration may continue with a step 900. At step 900, seat post 604 is extended out from its folded position within opening 128 along top side 112 of electric scooter 100. For example, seat post 604 is shown in the folded position inside outer casing 102 of electric scooter 100 in FIG. 6. When seat post 604 is transitioned from its folded position to an extended position, seat post 604 pivots around pivot mechanism 606 to move to a position outside of outer casing 102 extending past rear edge 110 of electric scooter 100, as shown in FIG. 9. Once seat post 604 has been pivoted outside of outer casing 102 from opening 128, seat 602 may be connected to top portion 608 of seat post 604 to allow a user to sit on electric scooter 100 in the riding configuration.

Figure 10:
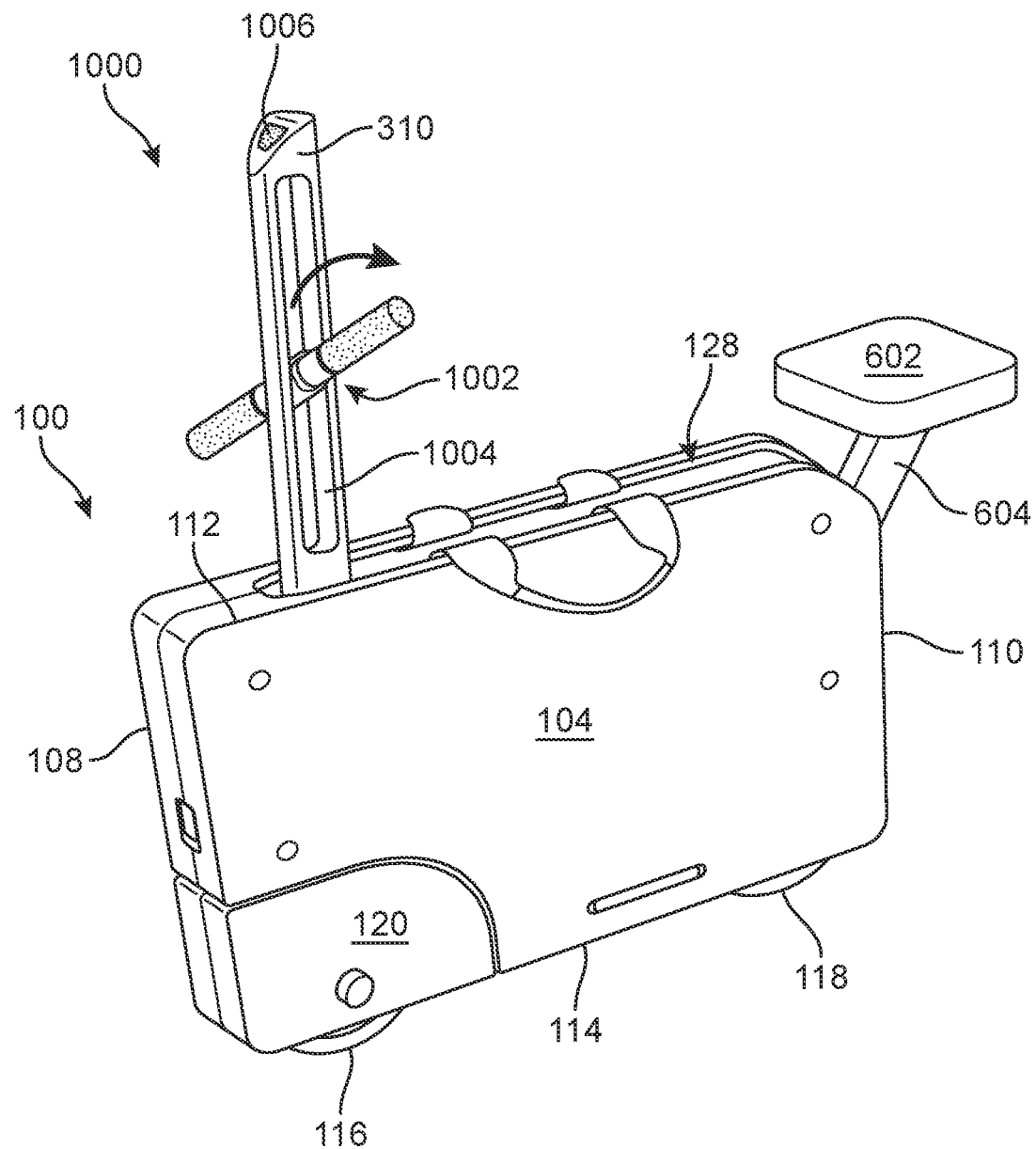
FIG. 10 is a representative view of a handlebar being pivoted out from the steering column in accordance with aspects of the present disclosure.
Figure 13:
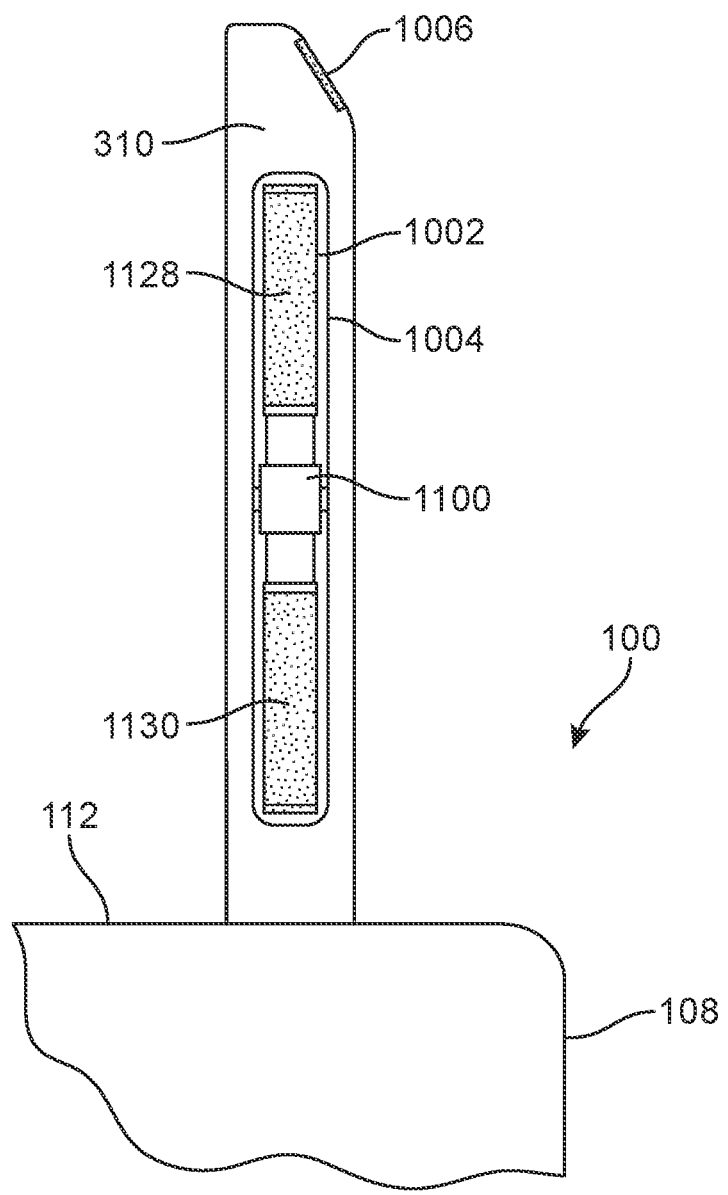
FIG. 13 is a side view of the electric scooter showing the handlebar positioned inside the steering column in accordance with aspects of the present disclosure.

Referring now to FIG. 10, the process of transitioning or converting electric scooter 100 from the stowed configuration to the riding configuration may continue with a step 1000. At step 1000, handlebar 1002 is pivoted out from inside a receiving slot 1004 of steering column 310. Handlebar 1002 is initially in a folded position having a substantially vertical orientation inside receiving slot 1004 of steering column 310 when steering column 310 is raised into its extended position so that it is extending upright from top edge 112 of electric scooter 100 (as shown in FIG. 13). Step 1000 moves handlebar 1002 from this folded position inside receiving slot 1004 of steering column 310 to an extended position with a substantially horizontal orientation so that handlebar 1002 is approximately perpendicular to steering column 310.

In some embodiments, steering column 310 may include a release button 1006 disposed at the top. Release button 1006 is configured to disengage handlebar 1002 from its connection with receiving slot 1004 of steering column 310. With this arrangement, handlebar 1002 and steering column 310 may be transitioned back from the extended positions to their original, folded positions.

Figure 11:
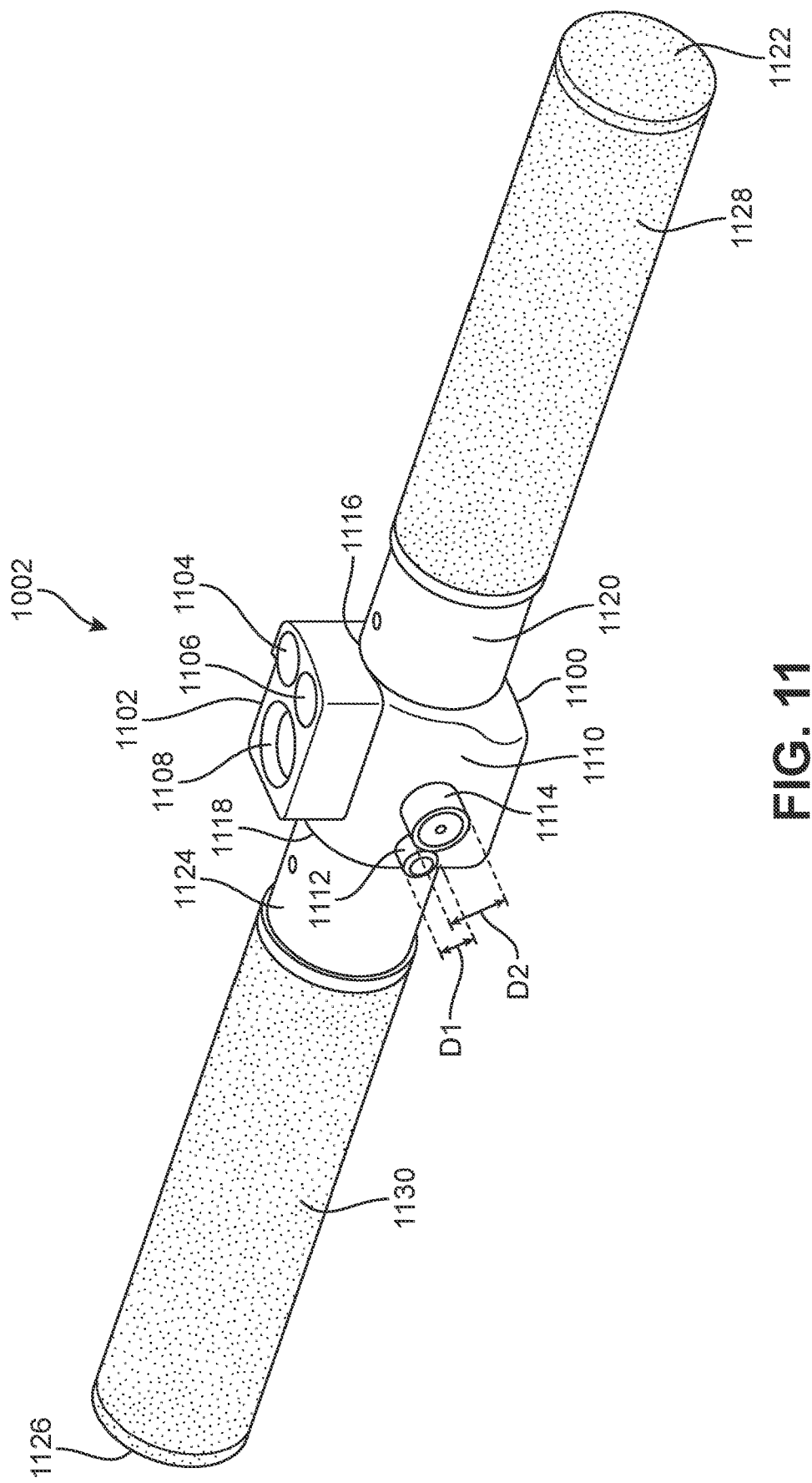
FIG. 11 is an enlarged view of the handlebar of the electric scooter in accordance with aspects of the present disclosure.

FIG. 11 shows an enlarged view of handlebar 1002. In this embodiment, handlebar 1002 includes a central hub 1100 that is located in the middle of handlebar 1002. Central hub 1100 includes a top portion 1102 that is configured to connect to a receiving member at the top of receiving slot 1004 of steering column 310. Top portion 1102 includes a pair of receptacles, including a first receptacle 1104 and a second receptacle 1106, which are configured to engage with corresponding prongs on the receiving member at the top of receiving slot 1004 of steering column 310, as will be described below. Top portion 1102 also includes a receiving aperture 1108 that is configured to engage with a corresponding engaging protrusion on the receiving member at the top of receiving slot 1004 of steering column 310 to mechanically lock handlebar 1002 in place.

In an example embodiment, a side portion 1110 of central hub 1100 of handlebar 1002 includes provisions configured to allow central hub 1100 to pivot within receiving slot 1004 of steering column 310 to transition from the folded position (e.g., having a substantially vertical orientation) to the extended position (e.g., having a substantially horizontal orientation). As shown in FIG. 11, side portion 1110 includes a first protrusion 1112 and a second protrusion 1114. In this embodiment, first protrusion 1112 and second protrusion 1114 are in the form of cylinders extending outward from side portion 1110 of handlebar 1002. In one embodiment, first protrusion 1112 has a first diameter (D1) that is smaller than a second diameter (D2) of second protrusion 1114. As will be described below, first protrusion 1112 and second protrusion 1114 are configured to fit into correspondingly sized tracks arranged vertically inside receiving slot 1004 of steering column 310. It should be understood that central hub 1100 may also include an opposite side portion (not visible in FIG. 11) that has a substantially similar configuration as side portion 1110, including another pair of protrusions substantially similar to first protrusion 1112 and second protrusion 1114 directly opposite from first protrusion 1112 and second protrusion 1114.

In an example embodiment, handlebar 1002 also includes a pair of rods extending outward from opposite sides of central hub 1100. As shown in FIG. 11, a first rod portion 1120 extends outward from a first side 1116 of central hub 1100 to a first end 1122. A second rod portion 1124 extends outward from a second side 1118 of central hub 1100 to a second end 1126. In some embodiments, first rod portion 1120 and second rod portion 1124 may be attached to central hub 1100, respectively, at first side 1116 and second side 1118. In other embodiments, first rod portion 1120 and second rod portion 1124 may be part of a continuous rod that extends from first end 1122 to second end 1126 and passes through central hub 1100. In this embodiment, first rod portion 1120 and second rod portion 1124 are substantially similarly shaped and sized cylinders that provide handlebar 1002 with an overall cylindrical shape. It should be understood that other shapes may be used for handlebar 1002.

In this embodiment, handlebar 1002 includes a pair of grips located at opposite sides of handlebar 1002, including a first grip 1128 located on first rod portion 1120 and a second grip 1130 located on second rod portion 1124. Grips 1128, 1130 are made of a material that provides friction and/or cushioning to hands of a user, for example, rubber, plastic, polymers, and combinations thereof. In an example embodiment, grips 1128, 1130 may be configured to slide along first rod portion 1120 and second rod portion 1124 from a folded position located near first side 1116 and second side 1118 to an extended position located at first end 1122 of first rod portion 1120 and second end 1126 of second rod portion 1124 when electric scooter 100 is in the riding configuration. Grips 1128, 1130 allow a user to comfortably and easily engage handlebar 1002 to control steering of electric scooter 100 in the riding configuration.

Figure 12:
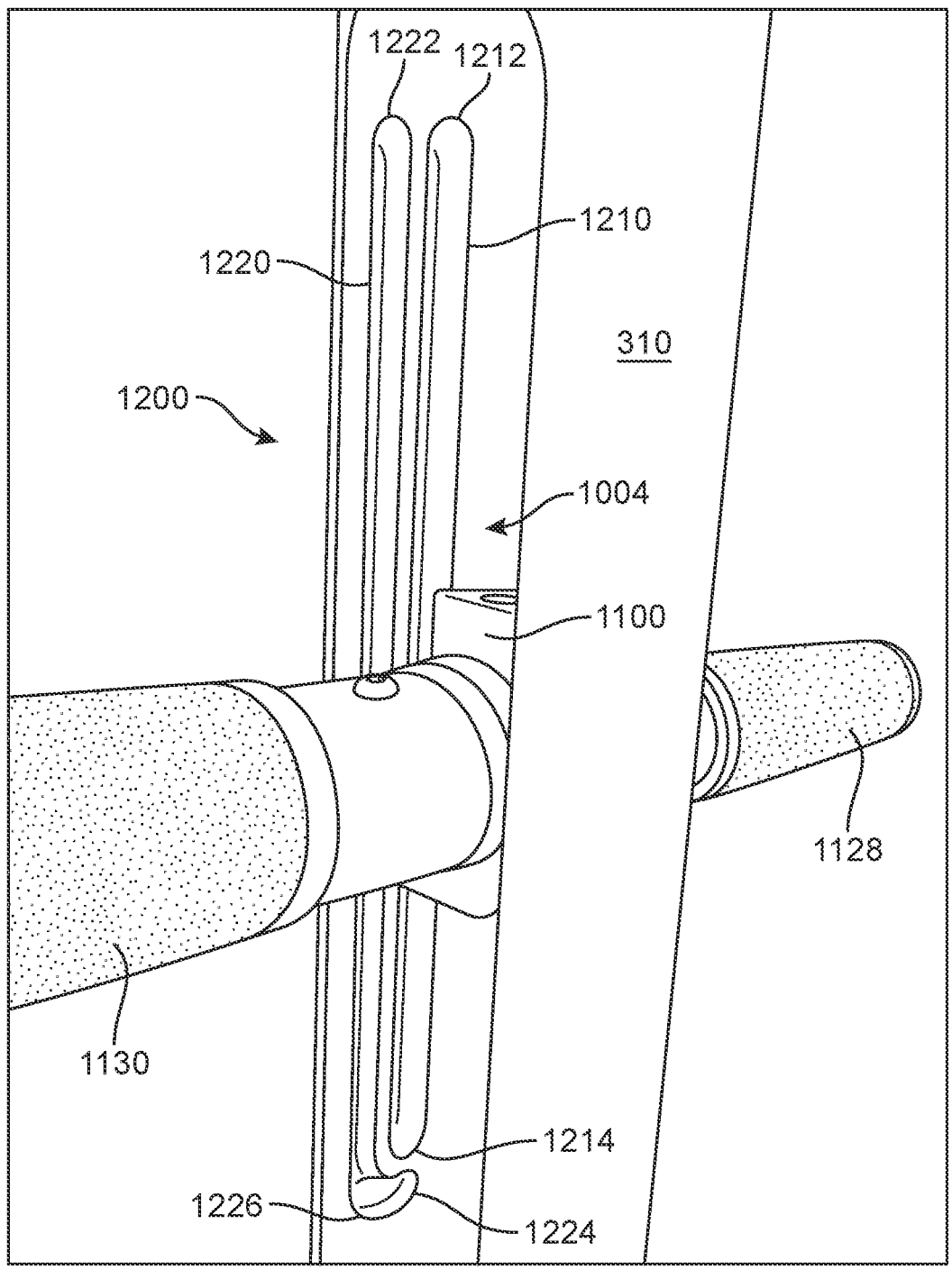
FIG. 12 is an enlarged view of the handlebar of the electric scooter disposed in a track mechanism of the steering column in accordance with aspects of the present disclosure.

Referring now to FIG. 12, an enlarged view of handlebar 1002 disposed in a track mechanism 1200 inside receiving slot 1004 of steering column 310 is shown. In an example embodiment, track mechanism 1200 includes a pair of tracks arranged vertically on each side inside receiving slot 1004 of steering column 310. For example, as shown in FIG. 12, a first pair of tracks on one side of the inside of receiving slot 1004 includes a first track 1210 and a second track 1220. First track 1210 extends substantially vertically along the inside of receiving slot 1004 of steering column 310 from a first end 1212 located near the top of receiving slot 1004 to a second end 1214 located near the bottom of receiving slot 1004 (i.e., closer to top edge 112 of electric scooter 100 than first end 1212).

Second track 1220 extends mostly vertically along the inside of receiving slot 1004 of steering column 310 from a first end 1222 located near the top of receiving slot 1004 to a second end 1224 located near the bottom of receiving slot 1004 (i.e., closer to top edge 112 of electric scooter 100 than first end 1222) and located vertically beneath second end 1214 of first track 1210. That is, second track 1220 includes a bend 1226 that routes second track 1220 from an approximately vertical orientation to an approximately horizontal orientation at second end 1224 so as to be located under or beneath second end 1214 of first track 1210. With this arrangement, a majority of second track 1220 extends vertically along the inside of receiving slot 1004 of steering column 310 parallel to first track 1210 until reaching bend 1226, where second track 1220 changes to a horizontal orientation so that second end 1224 is vertically below second end 1214 of first track 1210.

FIG. 12 shows a first pair of tracks of track mechanism 1200 on one side of the inside of receiving slot 1004 of steering column 310 (e.g., first track 1210 and second track 1220). It should be understood that a second pair of tracks of track mechanism 1200 have a substantially similar configuration on the opposite side of the inside of receiving slot 1004 of steering column 310 that is not visible in FIG. 12, including tracks substantially similar to first track 1210 and second track 1220 located directly opposite from first track 1210 and second track 1220.

Referring now to FIG. 13, a side view of electric scooter 100 showing handlebar 1002 positioned inside receiving slot 1004 of steering column 310 is shown. In this embodiment, steering column 310 has been raised from the folded position inside opening 128 in outer casing 102 of electric scooter 100 to the extended position that is approximately perpendicular to top edge 112 of electric scooter 100. Additionally, as shown in FIG. 13, handlebar 1002 is shown in the folded position inside receiving slot 1004 of steering column 310. As will be described in reference to FIGS. 14-16, handlebar 1002 is configured to pivot around central hub 1100 by interacting with track mechanism 1200 inside receiving slot 1004 of steering column 310 to transition handlebar 1002 from the folded position to the extended position so that it is ready to be used to steer electric scooter 100 in the riding configuration.

Figure 14:
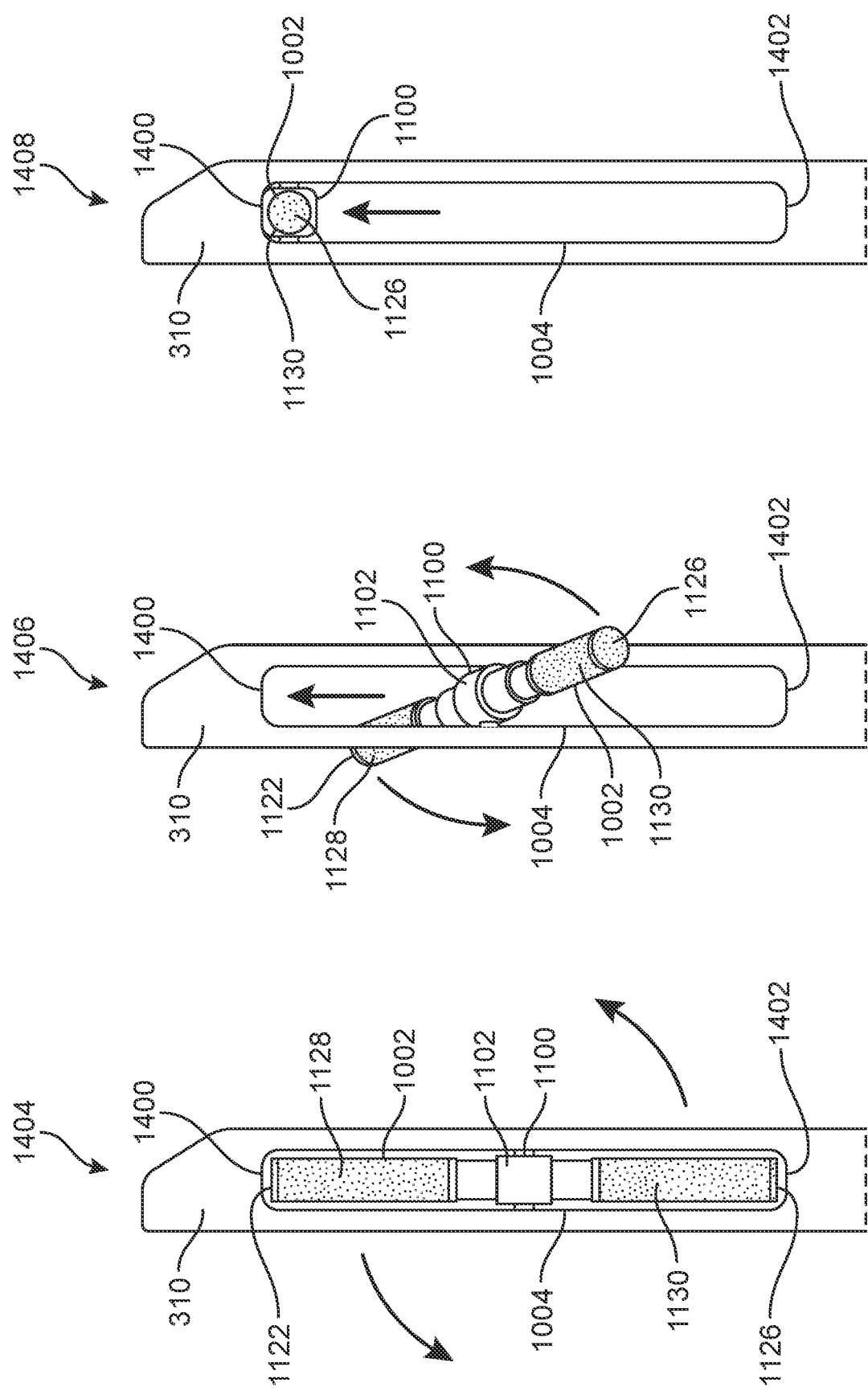
FIG. 14 is a schematic view of a process of pivoting the handlebar from inside the steering column to an extended position at the top of the steering column in accordance with aspects of the present disclosure.

Referring now to FIG. 14, a process of transitioning or converting handlebar 1002 from the folded position inside receiving slot 1004 of steering column 310 to an extended position at the top of steering column 310 is shown, for example, as part of step 1000, described above. In this embodiment, receiving slot 1004 of steering column 310 includes a top end 1400 and an opposite bottom end 1402 located vertically below top end 1400. As shown in a view 1404, handlebar 1002 is in an initial, folded position arranged substantially vertically within receiving slot 1004 of steering column 310 such that one end of handlebar 1002 (e.g., first end 1122) is adjacent to top end 1400 of receiving slot 1004 and the opposite end of handlebar 1002 (e.g., second end 1126) is adjacent to bottom end 1402 of receiving slot 1004.

In an example embodiment, as shown in a view 1406, handlebar 1002 may be pivoted from its initial folded position inside receiving slot 1004 (e.g., shown in view 1404) such that one end of handlebar 1002 (e.g., first end 1122) moves in a downward direction towards bottom end 1402 of receiving slot 1004, while the opposite end of handlebar 1002 (e.g., second end 1126) moves in an upward direction towards top end 1400 of receiving slot 1004. Central hub 1100 of handlebar 1002 remains engaged within the tracks of track mechanism 1200 inside receiving slot 1004 of steering column 310. In this embodiment, as shown in view 1406, when first end 1122 and second end 1126 of handlebar 1002 pivot outward from receiving slot 1004, central hub 1100 may slide upwards along the tracks of track mechanism 1200 towards top end 1400 of receiving slot 1004.

Next, as shown in a view 1408 of FIG. 14, once handlebar 1002 is fully transitioned from its folded position inside receiving slot 1004 to an extended position, handlebar 1002 has a substantially horizontal orientation within receiving slot 1004. That is, handlebar 1002 in the extended position is approximately perpendicular to receiving slot 1004 and/or steering column 310 as shown in view 1408. In addition, as shown in view 1408, central hub 1100 may slide all the way to top end 1400 of receiving slot 1004. In an example embodiment, receiving aperture 1108 on top portion 1102 of handlebar 1002 engages with a corresponding engaging protrusion on the receiving member at top end 1400 of receiving slot 1004 of steering column 310 to mechanically lock handlebar 1002 in place in the extended position. With this arrangement, handlebar 1002 may be transitioned or converted from the folded position to the extended position so that a user may steer electric scooter 100 in the riding configuration.

Figure 15:
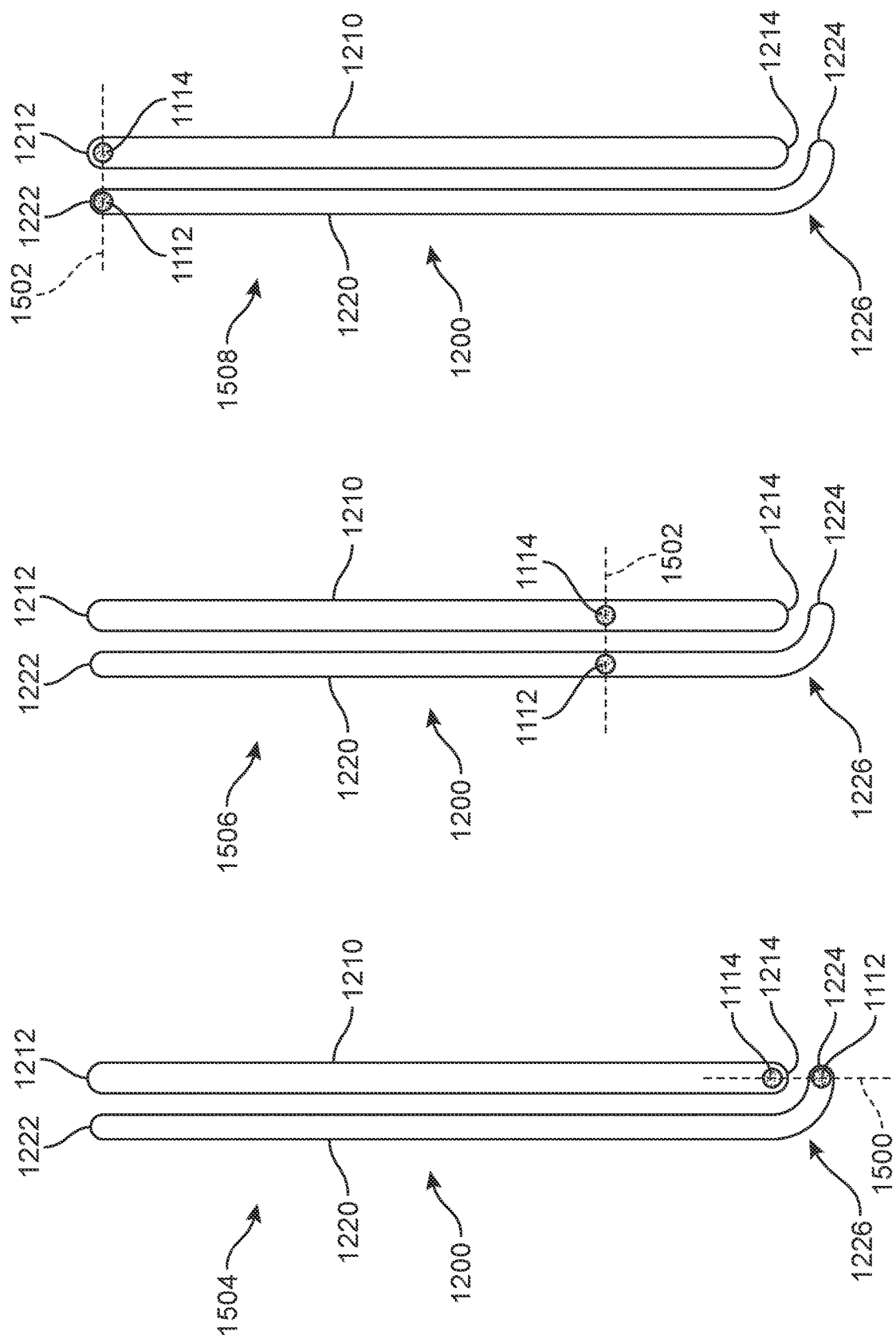
FIG. 15 is a schematic cross-sectional view of the track mechanism of the steering column during the process of pivoting the handlebar from inside the steering column to the extended position in accordance with aspects of the present disclosure.

FIG. 15 is a schematic cross-sectional view of track mechanism 1200 of steering column 310 during the process of pivoting the handlebar from inside the steering column to the extended position as shown in FIG. 14 above. In this embodiment, first protrusion 1112 and second protrusion 1114 on side portion 1110 of central hub 1100 of handlebar 1002 are shown disposed within the first pair of tracks of track mechanism 1200 (e.g., first track 1210 and second track 1220). In particular, second protrusion 1114 is shown in first track 1210 and first protrusion 1112 is shown disposed in second track 1220.

As described above, the size of second protrusion 1114 is larger than the size of first protrusion 1112 (i.e., second diameter D2 of second protrusion 1114 is greater than first diameter D1 of first protrusion 1112, as shown in FIG. 11). In an example embodiment, second track 1220 has a size that corresponds to the size of second protrusion 1114 such that second protrusion 1114 fits within second track 1220 and is configured to slide along second track 1220. Similarly, first track 1210 has a size that corresponds to the size of first protrusion 1112 such that first protrusion 1112 fits within first track 1210 and is configured to slide along first track 1210. That is, second track 1220 is larger (e.g., wider across the span of the track) than first track 1210 to accommodate the larger size of second protrusion 1114.

Referring back to FIG. 15, a cross-sectional view 1504 illustrates the positions of first protrusion 1112 and second protrusion 1114 relative to second track 1220 and first track 1210, respectively, of track mechanism 1200 associated with view 1404 of FIG. 14 when handlebar 1002 is in an initial, folded position. In view 1504, first protrusion 1112 and second protrusion 1114 are arranged substantially vertically within each respective track 1220, 1210. For example, as shown in view 1504 of FIG. 15, second protrusion 1114 is located at second end 1214 of first track 1210 above first protrusion 1114, which is located at second end 1224 of second track 1220 directly beneath second protrusion 1114 such that first protrusion 1112 and second protrusion 1114 are aligned along a vertical direction 1500. With this arrangement, handlebar 1002 is arranged substantially vertically in the initial, folded position within receiving slot 1004 of steering column 310, as shown in view 1404 of FIG. 14 above.

Next, a cross-sectional view 1506 illustrates the positions of first protrusion 1112 and second protrusion 1114 relative to second track 1220 and first track 1210, respectively, of track mechanism 1200 associated with view 1406 of FIG. 14 when handlebar 1002 is pivoted outward from the initial, folded position. As shown in FIG. 15, when first protrusion 1112 reaches bend 1226 in second track 1220, the direction of second track 1220 changes orientation from a substantially horizontal direction 1502 to vertical direction 1500. This change in orientation from horizontal direction 1502 to vertical direction 1500 causes central hub 1100 of handlebar 1002 to rotate approximately 90 degrees such that one end of handlebar 1002 (e.g., first end 1122) moves in a downward direction towards bottom end 1402 of receiving slot 1004, while the opposite end of handlebar 1002 (e.g., second end 1126) moves in an upward direction towards top end 1400 of receiving slot 1004, as shown in view 1406 of FIG. 14 above.

Additionally, first protrusion 1112 and second protrusion 1114 travel in their respective tracks 1220, 1210 in an upwards direction towards first end 1222 of second track 1220 and first end 1212 of first track 1210 as handlebar 1002 moves upwards in track mechanism 1200 towards top end 1400 of receiving slot 1004.

A cross-sectional view 1508 illustrates the positions of first protrusion 1112 and second protrusion 1114 relative to second track 1220 and first track 1210, respectively, of track mechanism 1200 associated with view 1408 of FIG. 14 when handlebar 1002 is fully transitioned from its folded position inside receiving slot 1004 to the extended position at top end 1400 of receiving slot 1004. In view 1508, first protrusion 1112 and second protrusion 1114 are arranged substantially horizontally within each respective track 1220, 1210. For example, as shown in view 1508 of FIG. 15, first protrusion 1114 is at first end 1222 of second track 1220 and second protrusion 1112 is at first end 1212 of first track 1210 such that first protrusion 1112 and second protrusion 1114 are aligned along horizontal direction 1502 when handlebar 1002 is in the extended position approximately perpendicular to receiving slot 1004 and/or steering column 310, as shown in view 1408 of FIG. 14 above. With this configuration, central hub 1100 of handlebar 1002 interacts with track mechanism 1200 to pivot handlebar 1002 from its initially vertical folded position inside receiving slot 1004 of steering column 310 to its horizontal extended position at top end 1400 of receiving slot 1004 when electric scooter 100 is in the riding configuration.

Figure 16:
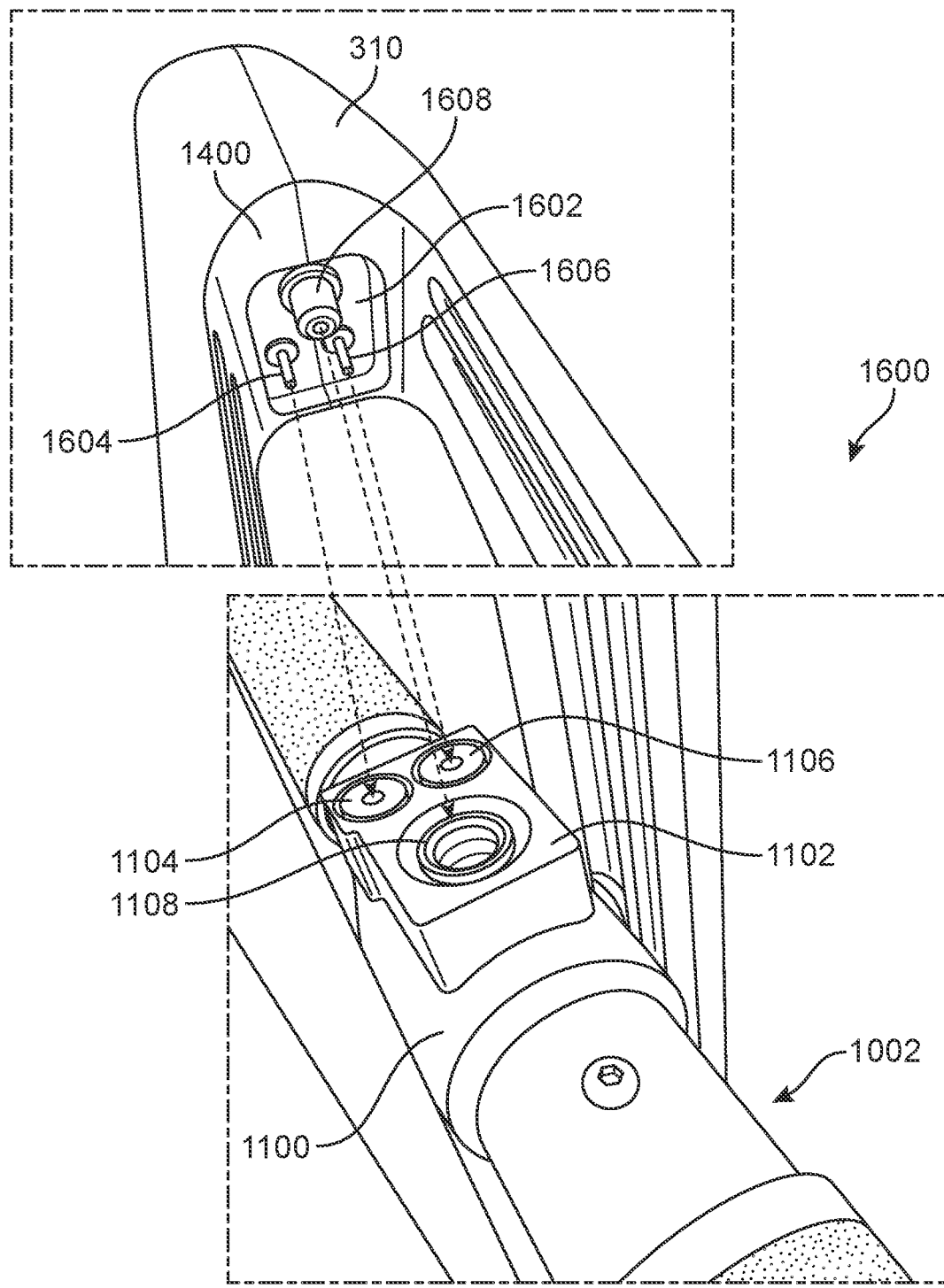
FIG. 16 is an enlarged view of a connection mechanism between the handlebar and the steering column in accordance with aspects of the present disclosure.

Referring now to FIG. 16, an enlarged view of a connection mechanism 1600 between handlebar 1002 and steering column 310 is shown. In an example embodiment, connection mechanism 1600 includes a receiving member 1602 located at top end 1400 of receiving slot 1004 of steering column 310. Connection mechanism 1600 also includes top portion 1102 of central hub 1100 of handlebar 1002 that is configured to connect to receiving member 1602, as described above. For example, top portion 1102 includes a pair of receptacles (e.g., first receptacle 1104 and second receptacle 1106) that engage with corresponding prongs, including a first prong 1604 and a second prong 1606, on receiving member 1602 at top end 1400 of receiving slot 1004 of steering column 310.

In an example embodiment, first prong 1604 and second prong 1606 are positive and negative terminals that are electrically connected to a battery (e.g., battery 600, described above). First receptacle 1104 and second receptacle 1106 are configured to engage with first prong 1604 and second prong 1606 to electrically connect handlebar 1002 to the electrical system of electric scooter 100. That is, the connection between first prong 1604 and first receptacle 1104 and second prong 1606 and second receptacle 1106 completes an electrical circuit, allowing operation of electric scooter 100. With this arrangement, electric scooter 100 may not be electrically activated (i.e., electricity is not provided from battery 600 to components of electric scooter 100) until handlebar 1002 is raised to the extended position at top end 1400 of receiving slot 1004 of steering column 310 and first prong 1604 and first receptacle 1104 and second prong 1606 and second receptacle 1106 are connected to each other. This arrangement also allows handlebar 1002 to be provided with electricity without requiring wires that may interfere with track mechanism 1200.

In some embodiments, connection mechanism 1600 further includes an engaging protrusion 1608 on receiving member 1602 that engages with receiving aperture 1108 on top portion 1102 of central hub 1100 of handlebar 1002. Engaging protrusion 1608 and receiving aperture 1108 mechanically fit together (e.g., a friction fit) at top end 1400 of receiving slot 1004 of steering column 310 to mechanically lock handlebar 1002 in place in the extended position when electric scooter 100 is in the riding configuration. In some embodiments, one or both of engaging protrusion 1608 and receiving aperture 1108 may include a magnet to assist with making the connection between engaging protrusion 1608 and receiving aperture 1108.

Additionally, release button 1006, described above, may be configured to cause engaging protrusion 1608 to be released or removed from receiving aperture 1108 on top portion 1102 of central hub 1100 of handlebar 1002 to unlock handlebar 1002 so that handlebar 1002 and/or steering column 310 may be returned back from the extended position to the folded position (e.g., when electric scooter 100 is returned to the stowed configuration).

Figure 17:
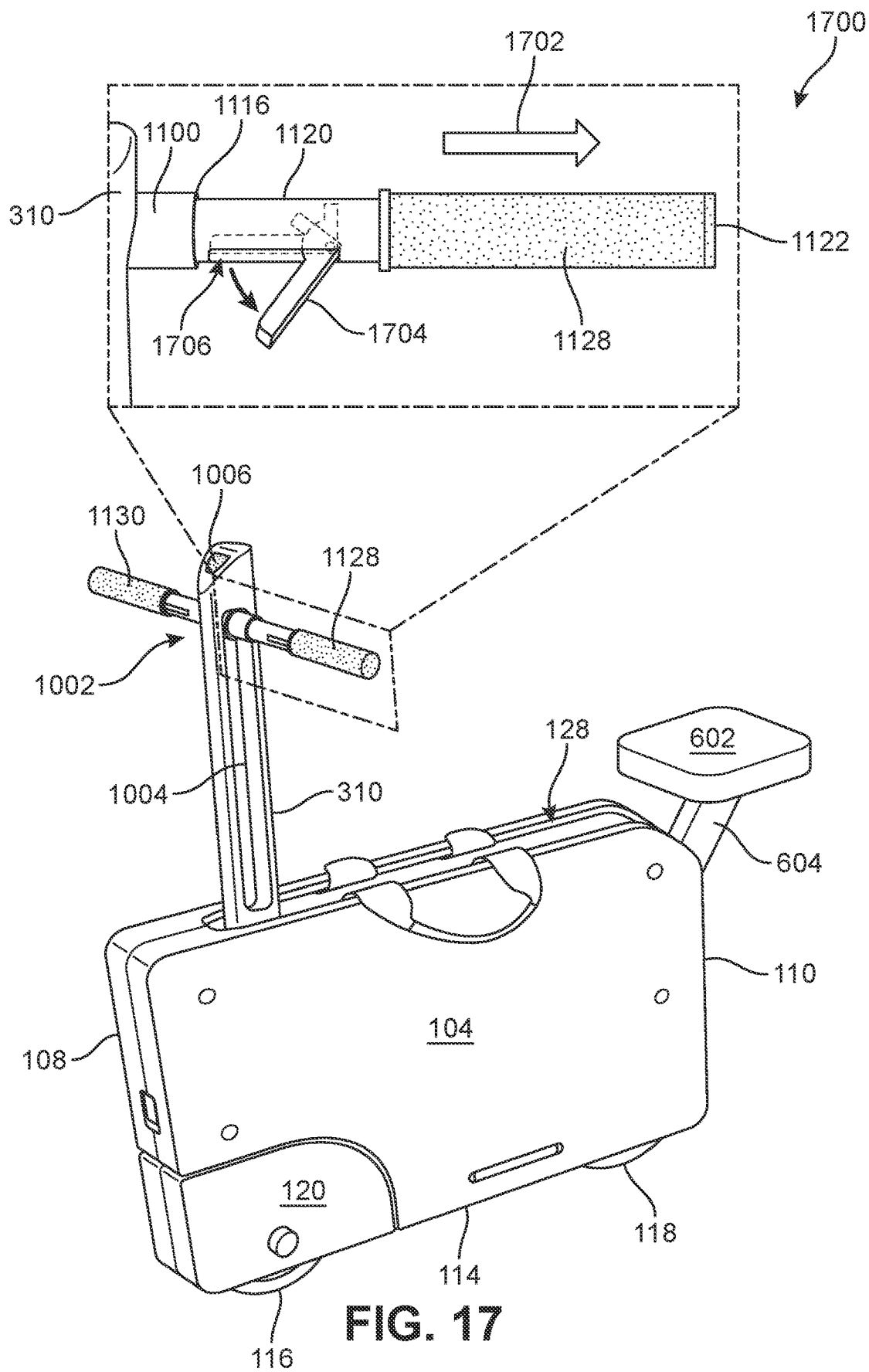
FIG. 17 is a representative view of handgrips being extended out from the handlebar of the electric scooter in accordance with aspects of the present disclosure.

Referring now to FIG. 17, the process of transitioning or converting electric scooter 100 from the stowed configuration to the riding configuration may continue with a step 1700. At step 1700, grips 1128, 1130 on handlebar 1002 are extended outwards towards the ends of handlebar 1002 (e.g., first end 1122, second end 1126). For example, as shown in FIG. 17, first grip 1128 slides along first rod portion 1120 from a folded position located near first side 1116 to an extended position located at first end 1122 of first rod portion 1120 and second grip 1130 slides along second rod portion 1124 from the folded position located near second side 1118 to the extended position located at second end 1126 of second rod portion 1124. With this arrangement, grips 1128, 1130 may be extended outward towards the opposite ends of handlebar 1002 (e.g., first end 1122, second end 1126) when electric scooter 100 is in the riding configuration.

Additionally, in some embodiments, controls for operating electric scooter 100 may be disposed beneath one or both grips 1128, 1130 when grips 1128, 1130 are in the folded position. When grips 1128, 1130 are moved to the extended position, the controls are then exposed on first rod portion 1120 and/or second rod portion 1124 so that a user may use the controls to operate electric scooter 100. For example, the controls may include at least a throttle (e.g., configured to increase power and/or speed of electric scooter 100) and a brake (e.g., configured to decrease power and/or speed of electric scooter 100). In some embodiments, the functions of a throttle and brake may be combined so that electric scooter 100 will only increase power/speed when a lever is depressed and otherwise will use regenerative braking by the electric motor (e.g., integrated into front wheel 116, as described above) to slow electric scooter 100 when the lever is not depressed.

As shown in FIG. 17, moving first grip 1128 in an outwards direction 1702 along first rod portion 1120 from its folded position located near first side 1116 of central hub 1100 to an extended position located at first end 1122 of first rod portion 1120 exposes a lever 1704. In some embodiments, lever 1704 may be fit into a recess 1706 in first rod portion 1120 that is initially covered by first grip 1128 when first grip 1128 is in the folded position located near first side 1116 of central hub 1100. When first grip 1128 moves in outwards direction 1702 to the extended position located at first end 1122 of first rod portion 1120, lever 1704 may move outwards from recess 1706 in first rod portion 1120 via a spring or similar mechanism (not shown).

In an example embodiment, lever 1704 provides functions of a throttle and brake to increase power/speed of electric scooter when lever 1704 is depressed (e.g., moved towards first rod portion 1120) and reduces power/speed to slow electric scooter 100 when lever 1704 is not depressed, for example, via regenerative braking by the electric motor integrated into front wheel 116, as described above. Additionally, lever 1704 may be electrically connected to the electrical system of electric scooter 100, via connection mechanism 1600, described above. In some embodiments, a wireless communication technology, such as Bluetooth or similar, may be used to send commands from lever 1704 to a control unit associated with the electric motor (e.g., integrated into front wheel 116, as described above) that moves electric scooter 100. With this arrangement, lever 1704 allows a user to control the speed of electric scooter 100 in the riding configuration.

Figure 18:
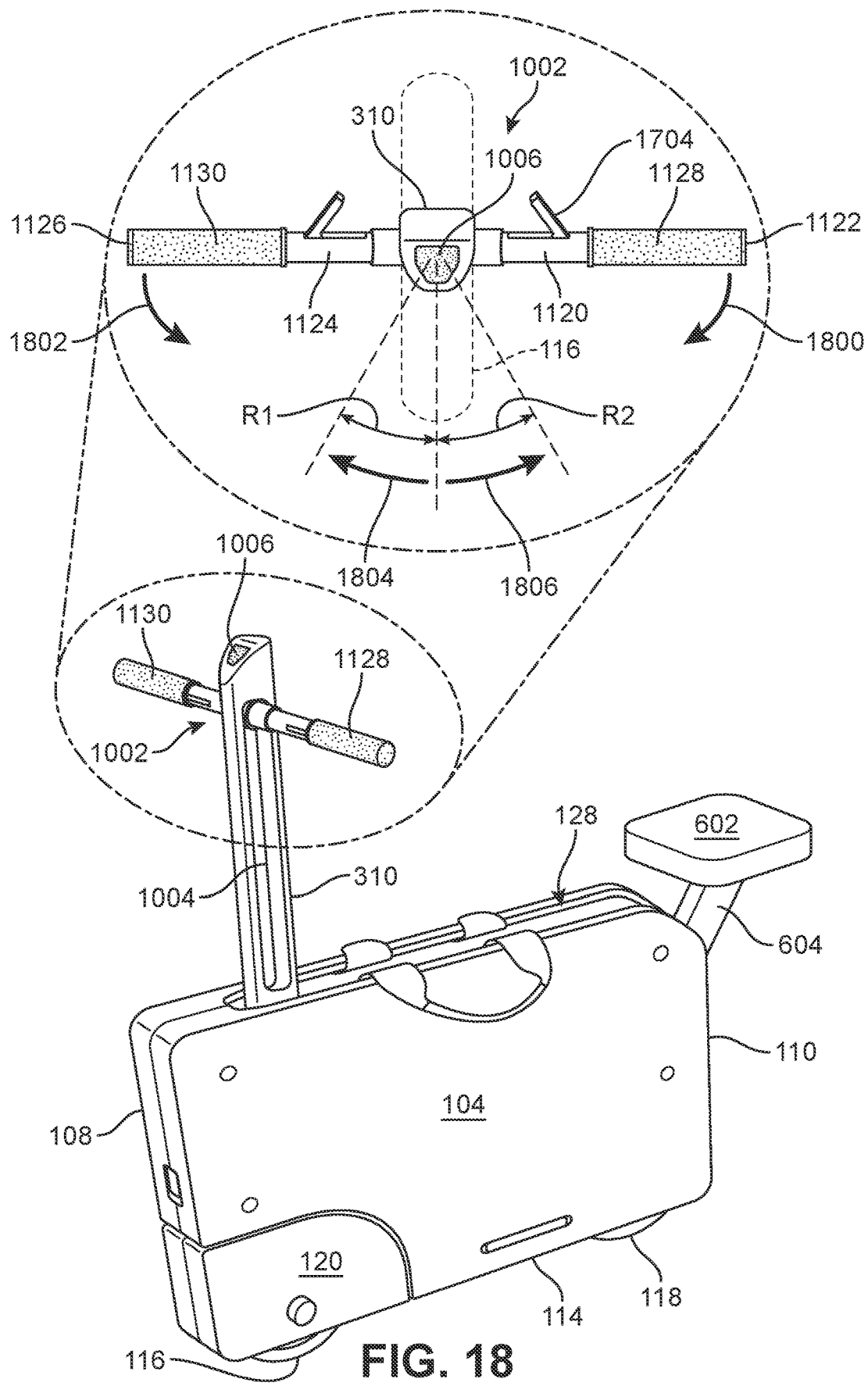
FIG. 18 is a schematic view of a steering range of motion of the electric scooter in accordance with aspects of the present disclosure.

FIG. 18 is a schematic view of a steering range of motion of electric scooter 100 in accordance with aspects of the present disclosure. In an example embodiment, a user may control the angular direction of front wheel 116 using handlebar 1002 (connected to front wheel 116 via steering assembly 620, described above) to steer electric scooter 100. For example, as shown in this embodiment, a user may move first end 1122 of handlebar 1002 via first grip 1128 in a first direction 1800 to cause front wheel 116 to rotate in a corresponding first direction 1804. Similarly, a user may move second end 1126 of handlebar 1002 via second grip 1130 in a second direction 1802 to cause front wheel 116 to rotate in a corresponding second direction 1806. In an example embodiment, the steering range of motion of front wheel 116 of electric scooter 100 is a first range R1 in first direction 1804 and a second range R2 in second direction 1806.

In some embodiments, first range R1 and second range R2 are equal. In one embodiment, first range R1 and second range R2 are approximately 25 degrees in each direction 1804, 1806, for a total steering range of motion of 50 degrees. In another embodiment, first range R1 and second range R2 are approximately 30 degrees in each direction 1804, 1806, for a total steering range of motion of 60 degrees. In other embodiments, the steering ranges (e.g., R1 and/or R2) may be larger or smaller.

Figure 19:
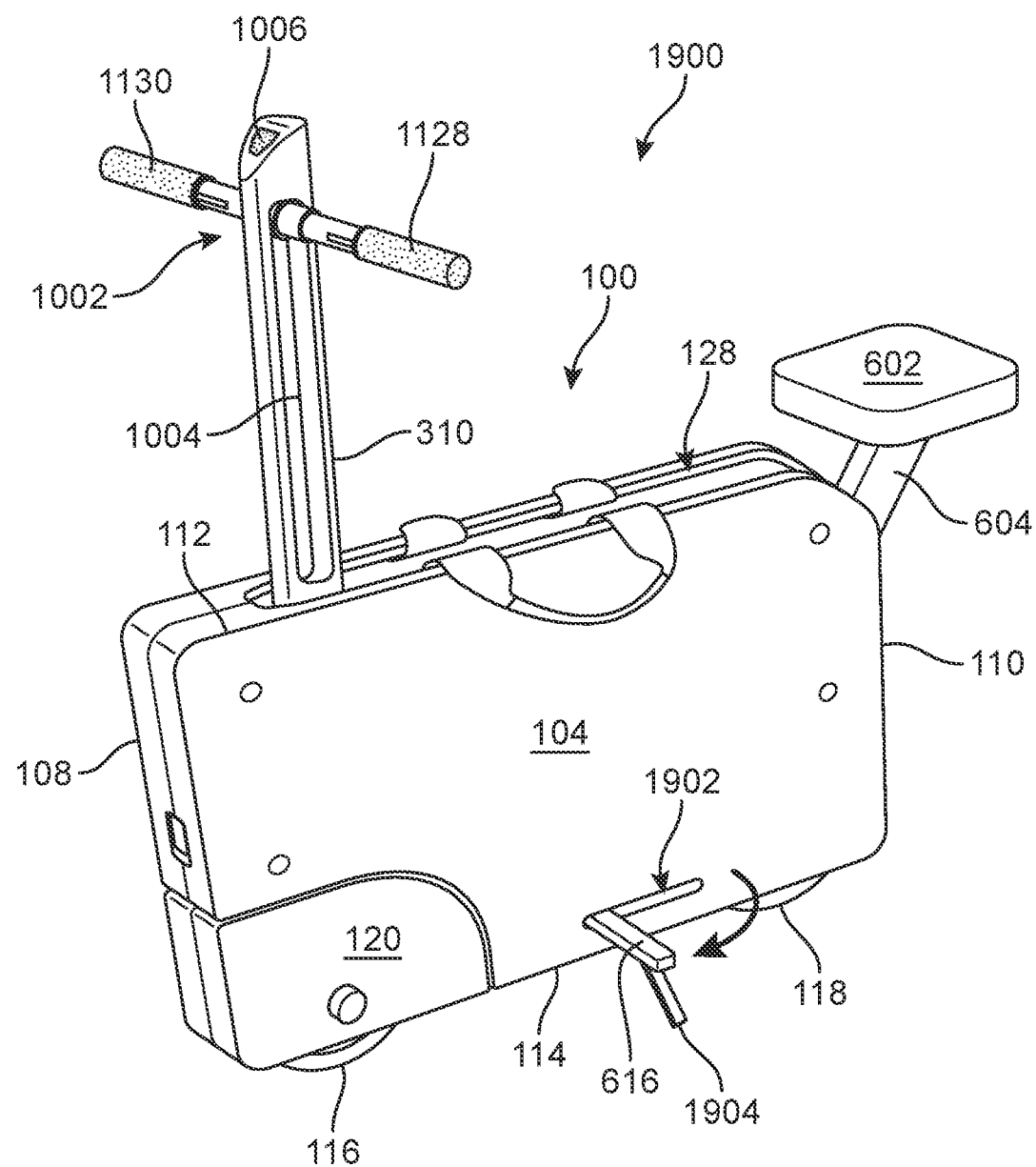
FIG. 19 is a representative view of foot pedals being folded out from a side of the electric scooter in accordance with aspects of the present disclosure.

Referring now to FIG. 19, the process of transitioning or converting electric scooter 100 from the stowed configuration to the riding configuration may continue with a step 1900. At step 1900, foot pedals 616 are folded out from a recess 1902 in side surface 104 of electric scooter 100 near bottom edge 114. As described above, foot pedals 616 may be disposed at one end of mounting bracket 614 that is fixedly attached inside outer casing 102 of electric scooter 100. As shown in FIG. 19, foot pedals 616 are configured to pivot outward (e.g., 90 degrees) from a folded position inside recess 1902 of electric scooter 100 in the stowed configuration to an extended position approximately perpendicular to side surface 104 of outer casing 102 of electric scooter 100 in the riding configuration. Additionally, foot pedals 616 similarly extend out from side surface 106 opposite side surface 104 of electric scooter 100 so that a user may place their feet on foot pedals 616 on both sides of electric scooter 100. With this arrangement, pedals 616 may be provided to allow a user to rest their feet above the ground surface while riding electric scooter 100.

In addition, in some embodiments, foot pedals 616 may include a kickstand 1904 that is configured to fold outwards from a bottom portion of foot pedals 616. For example, as shown in FIG. 19, once foot pedals 616 have been pivoted outward from recess 1902 in side surface 104 of electric scooter 100, kickstand 1904 may then be extended downwards towards the ground surface. With this arrangement, kickstand 1904 allows electric scooter 100 to remain in an upright position on the ground surface when the user is not riding electric scooter 100. Additionally, kickstand 1904 keeps electric scooter 100 from resting on the ground surface along its side surfaces 104, 106, thereby preventing scrapes, scuffing, and/or damage to electric scooter 100.

Figure 20:
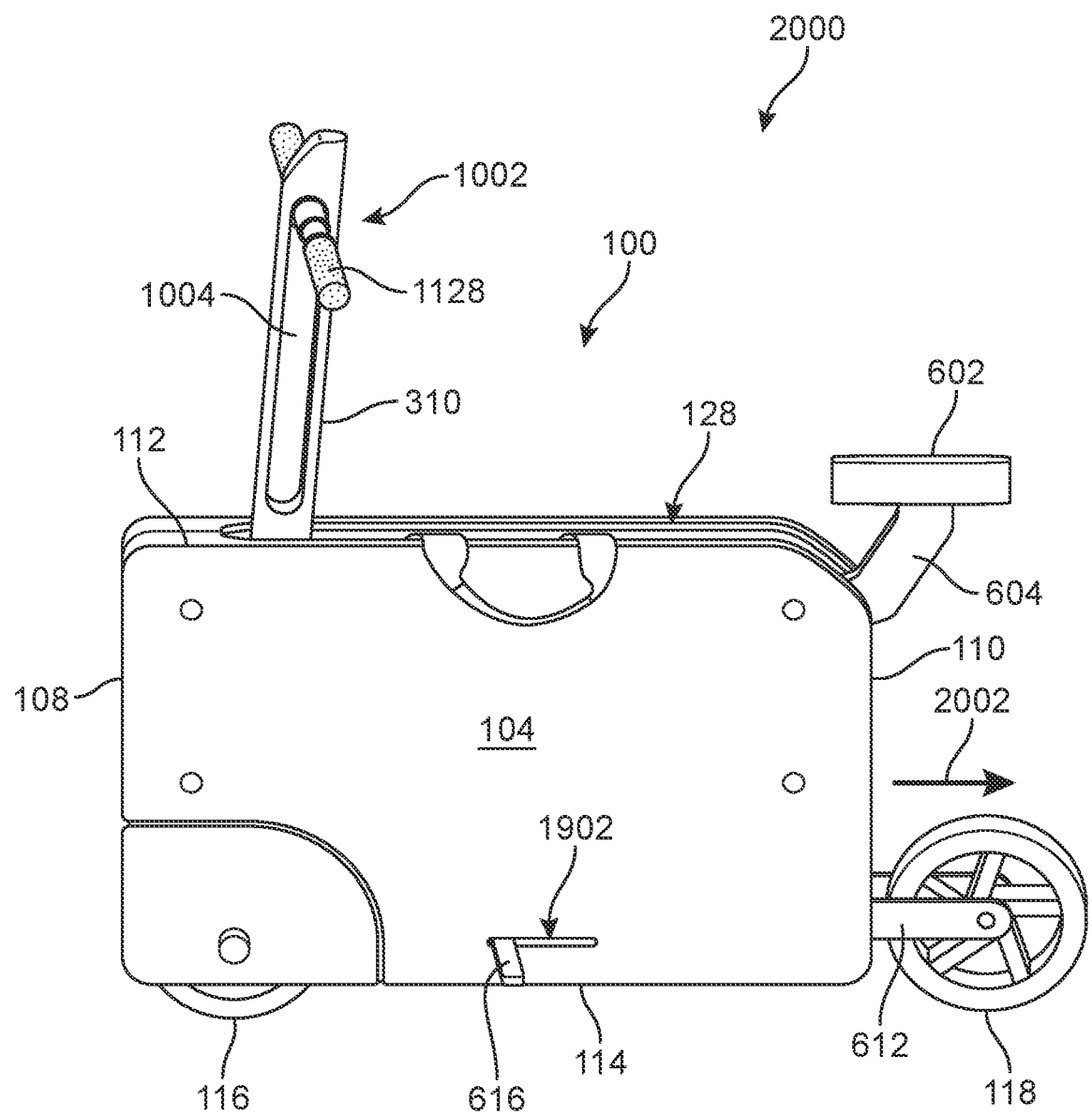
FIG. 20 is a representative view of a rear wheel extending out from inside the electric scooter to complete the transition from the stowed configuration to the riding configuration in accordance with aspects of the present disclosure.

Referring now to FIG. 20, the process of transitioning or converting electric scooter 100 from the stowed configuration to the riding configuration may continue with a step 2000. At step 2000, rear wheel 118 extends out from inside electric scooter 100 to complete the transition from the stowed configuration to the riding configuration. For example, in one embodiment, rear wheel 118 may be pulled outward in a direction 2002 away from rear edge 110 of electric scooter 100 to fully extend rear wheel 118 for riding. As described above, rear wheel 118 is mounted to arm 612 that allows rear wheel 118 to extend outward in direction 2002. Arm 612 is configured to engage with a stop mechanism (not shown) that limits or stops the linear movement of rear wheel 118 by engaging with the opposite end of arm 612 once rear wheel 118 reaches its fully extended position, as shown in FIG. 20. With this arrangement, electric scooter 100 may be transitioned from the stowed configuration to the riding configuration and is ready for a user.

In an example embodiment, the process of transitioning or converting electric scooter 100 from the stowed configuration to the riding configuration shown above with reference to the steps of FIGS. 7 through 20 may take a user approximately 30 seconds to complete. Similarly, the illustrated process may be carried out in the reverse order as shown to transition or convert electric scooter 100 back from the riding configuration to the stowed configuration. This process may also take a user approximately 30 seconds to complete. With this configuration, electric scooter 100 may be a convenient electric transport device for a user to carry or transport in the stowed configuration via a primary vehicle and quickly converted to the riding configuration to be used for "last-mile" or "first-mile" travel by the user to a destination.

Figure 21:
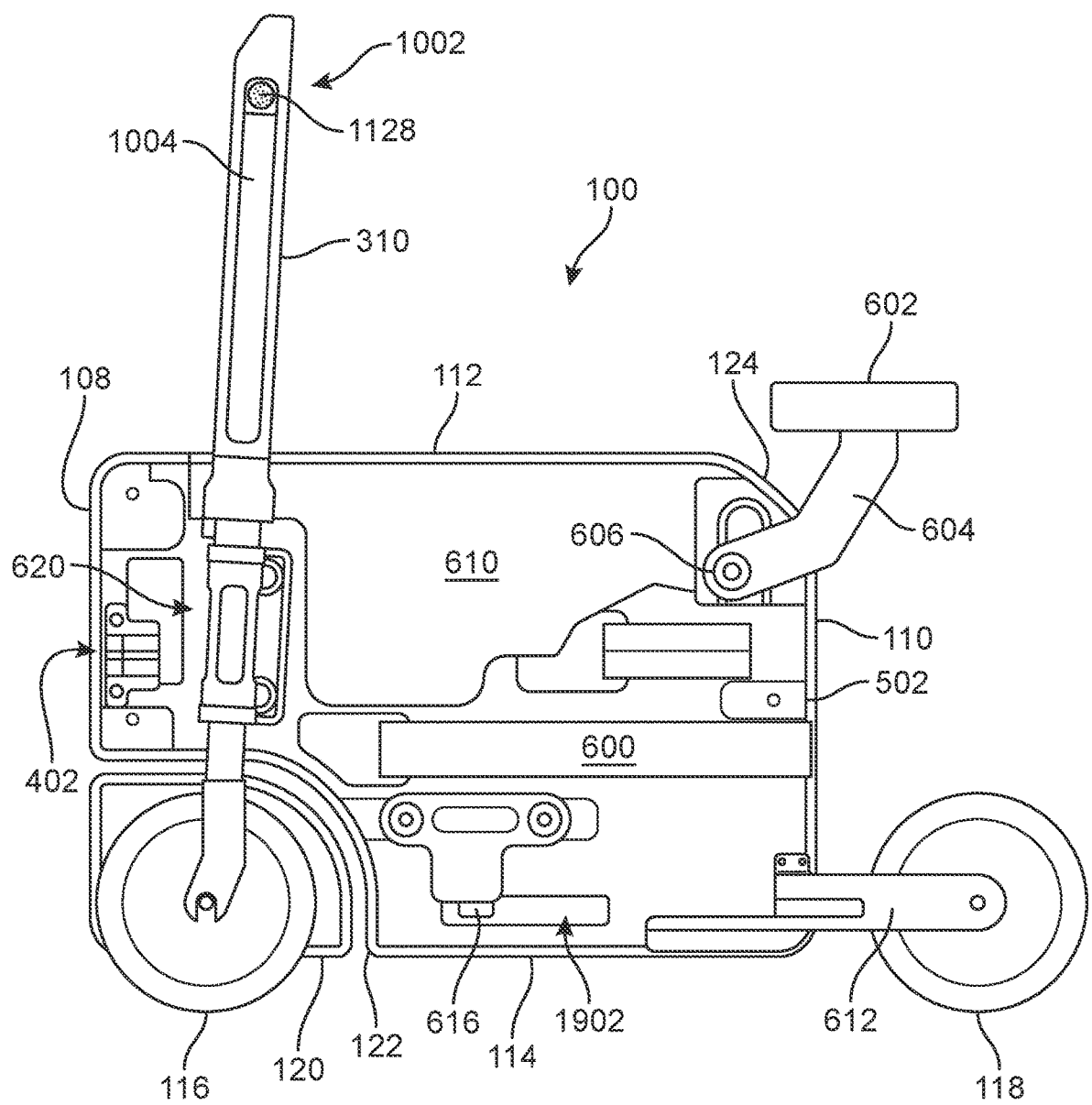
FIG. 21 is a representative view of internal components of the example embodiment of the electric scooter in the riding configuration in accordance with aspects of the present disclosure.

FIG. 21 is a representative view of internal components of the example embodiment of electric scooter 100 in the riding configuration in accordance with aspects of the present disclosure. In contrast to FIG. 6 above (which illustrates the components of electric scooter 100 in the stowed configuration), FIG. 21 illustrates the components of electric scooter 100 in the riding configuration, with each individual component transitioned from its folded position inside of outer casing 102 of electric scooter 100 to its extended position outside of outer casing 102.

For example, as shown in this embodiment, steering column 310 and handlebar 1002 of steering assembly 620 are in their extended positions (as described above) and are ready to allow a user to control steering and movement of electric scooter 100. Seat 602 is also shown in its extended position attached to seat post 604 behind rounded corner 124 located at the rear of electric scooter 100 and is ready to receive a user. Rear wheel 118 is also shown in its extended position outside of outer casing 102 at the end of arm 612. In addition, in this embodiment, storage compartment 610 is empty and can be used by a user to store small objects, such as a mobile device, when electric scooter 100 is in the riding configuration. In some cases, battery 600 may also be configured to charge the user's mobile device from within storage compartment 610, as described above.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A foldable steering assembly for an electric transport device, comprising:
   a steering column disposed within an opening along a top surface of the electric transport device, wherein the steering column has a horizontal orientation that extends along a length of the electric transport device within the opening in a folded position;
   a steering shaft connected to an axle of a wheel of the electric transport device;
   a hinge connecting the steering column to the steering shaft;
   wherein the steering column is configured to transition to a vertical orientation that is perpendicular to the opening along the top surface of the electric transport device in an extended position; and
   wherein the hinge brings into contact a lower portion of the steering shaft to a bottom portion of the steering column when the steering column is in the extended position.

2. The foldable steering assembly according to claim 1, further comprising a fork connected to the axle at one end and to the lower portion of the steering shaft at an opposite end.

3. The foldable steering assembly according to claim 1, further comprising a latch element that locks the steering column in the vertical orientation in the extended position, the latch element comprising:
   a receiving aperture on an end of the lower portion of the steering shaft;
   an engaging protrusion on the bottom portion of the steering column; and
   wherein the engaging protrusion is configured to mate with the receiving aperture to lock the steering column in the vertical orientation in the extended position.

4. The foldable steering assembly according to claim 3, further comprising a release tab disposed at an end of the latch element;
   wherein the release tab is configured to allow the engaging protrusion to be released or removed from the receiving aperture.

5. The foldable steering assembly according to claim 1, further comprising:
   a receiving slot extending vertically along a length of the steering column; and
   a handlebar disposed within the receiving slot, the handlebar having a vertical orientation inside the receiving slot in a folded position.

6. The foldable steering assembly according to claim 5, wherein the handlebar includes a central hub in connection with a track mechanism inside the receiving slot of the steering column.

7. The foldable steering assembly according to claim 6, wherein the handlebar is configured to pivot around the central hub to transition the handlebar from the vertical orientation within the receiving slot to a horizontal orientation in an extended position such that the handlebar is perpendicular to the steering column.

8. The foldable steering assembly according to claim 7, further comprising a connection mechanism at a top end of the receiving slot that locks the handlebar in the extended position.

9. The foldable steering assembly according to claim 8, further comprising a release mechanism on the steering column, the release mechanism being configured to unlock the handlebar from the extended position to allow the steering column to collapse back to the folded position within the opening of the electric transport device.

10. A steering column for an electric transport device, comprising:
    a receiving slot extending vertically along a length of the steering column;
    a handlebar disposed within the receiving slot, the handlebar having a vertical orientation inside the receiving slot in a folded position; and
    wherein the handlebar is configured to pivot around a central hub to transition the handlebar from the vertical orientation within the receiving slot to a horizontal orientation in an extended position such that the handlebar is perpendicular to the steering column.

11. The steering column according to claim 10, wherein the central hub of the handlebar is in connection with a track mechanism inside the receiving slot of the steering column.

12. The steering column according to claim 11, wherein the track mechanism comprises a pair of tracks extending substantially vertically along the inside of the receiving slot.

13. The steering column according to claim 12, wherein the central hub of the handlebar comprises a side portion having a first protrusion and a second protrusion extending outward from the side portion; and
    wherein the first protrusion is configured to fit into a first track of the pair of tracks and wherein the second protrusion is configured to fit into a second track of the pair of tracks.

14. The steering column according to claim 13, wherein the first track includes a bend that changes the orientation of the first track from vertical to horizontal.

15. The steering column according to claim 14, wherein an end of the second track is disposed adjacent to the bend in the first track and vertically above an end of the first track.

16. The steering column according to claim 15, wherein the handlebar is configured to pivot when the first protrusion disposed within the first track slides through the bend in the first track so that an orientation of the handlebar transitions from the vertical orientation to the horizontal orientation.

17. The steering column according to claim 10, further comprising a connection mechanism at a top end of the receiving slot that locks the handlebar in the extended position;

the connection mechanism including a pair of prongs on a receiving member at the top end of the receiving slot that engage with a pair of receptacles on a top portion of the central hub of the handlebar.

18. The steering column according to claim 17, further comprising a release mechanism on the steering column, the release mechanism being configured to unlock the handlebar from the extended position.

\* \* \* \* \*